United States Patent
Lenzie

(10) Patent No.: US 6,728,720 B1
(45) Date of Patent: Apr. 27, 2004

(54) IDENTIFYING PREFERRED INDEXES FOR DATABASES

(76) Inventor: Robert Stephen Gerard Lenzie, 129 Westfield Road, Harpendon, Hartfordshire (GB), AL5 4JZ ( * ) Notice: Subject to any disclaimer, the term of this patent is extended or adjusted under 35 U.S.C. 154(b) by 498 days.

(21) Appl. No.: 09/593,066

(22) Filed: Jun. 13, 2000

(30) Foreign Application Priority Data

Jul. 2, 1999 (GB) .............................................. 9915465

(51) Int. Cl.[7] .............................................. G06F 17/00
(52) U.S. Cl. ........................... 707/101; 707/2; 707/3; 707/5; 707/102
(58) Field of Search ...................... 707/3, 5, 101, 707/2, 102

(56) References Cited

U.S. PATENT DOCUMENTS

| | | | | |
|---|---|---|---|---|
| 5,404,510 A | * | 4/1995 | Smith et al. ................ | 707/101 |
| 5,615,367 A | * | 3/1997 | Bennett et al. ............ | 707/102 |
| 5,787,416 A | * | 7/1998 | Tabb et al. .................... | 707/2 |
| 5,870,750 A | * | 2/1999 | Oyama et al. .............. | 707/101 |
| 5,913,207 A | | 6/1999 | Chaudhuri et al. ............ | 707/2 |
| 5,926,813 A | * | 7/1999 | Chaudhuri et al. ............ | 707/5 |
| 5,960,423 A | * | 9/1999 | Chaudhuri et al. ............ | 707/2 |
| 6,182,079 B1 | * | 1/2001 | Lenzie ........................ | 707/101 |
| 6,427,145 B1 | * | 7/2002 | Hara et al. ..................... | 707/3 |

FOREIGN PATENT DOCUMENTS

| | | |
|---|---|---|
| EP | 0351388 | 1/1990 |
| WO | WO9722939 | 6/1997 |

OTHER PUBLICATIONS

Chaudhuri et al., "Index Merging", IEEE, Mar. 1999, pp. 296–303.*

Komo et al., "Neural Network Technology for Stock Market Index Prediction", IEEE, 1994, pp. 543–546.*

* cited by examiner

Primary Examiner—Thuy N. Pardo
(74) Attorney, Agent, or Firm—Richard M. Goldberg

(57) ABSTRACT

Preferred indexes for a relational database are identified. Queries from users are received and a sample of user queries are analysed to identify candidate indexes. Index permutations are identified by processing the candidate indexes in combinations identified from the sample of user queries. A preferred index set is identified by comparing the performance of the index permutations.

30 Claims, 24 Drawing Sheets

| BOOK TITLE | AUTHOR | ISBN | TOPIC | SUB-TOPIC | PRICE | SOLD | STOCK | IN PRINT |
|---|---|---|---|---|---|---|---|---|
| Solomons Organic Chemistry | T.W.G. Solomons | 0-471-01342-0 | Chemistry | Organic Chemistry | 26.50 | 3 | 5 | yes |
| Object Oriented Technology | Jurgen Ziegler | 0-13-227943-6 | Computers | Software Engineering | 95.00 | 24 | 7 | yes |
| Graphics Gems III | David Kirk | 0-12-409673-5 | Computers | Computer Graphics | 35.00 | 87 | 20 | yes |
| Data Communications, Computer Networks & Open Systems | Fred Halsall | 0-201-42293-X | Engineering | Communications | 24.95 | 5 | 1 | no |
|  |  |  |  |  |  |  |  |  |
|  |  |  |  |  |  |  |  |  |

*Figure 6*

| CUSTOMER NUMBER | HOUSE NUMBER | STREET | TOWN | COUNTRY |
|---|---|---|---|---|
| 64296 | 5 | Sheppard Road | Ipswich | United Kingdom |
| 64297 | 22 | Lightfoot Street | Liverpool | United kingdom |
| 64298 | 3 | High Holborn | London | United Kingdom |
| 64299 | 55 | Abbey Road | Nkare | Uganda |
| | | | | |
| | | | | |

901 — CUSTOMER NUMBER
902 — HOUSE NUMBER
903 — STREET
904 — TOWN
905 — COUNTRY
← 504

*Figure 9*

| TABLE 1501 | STATEMENT LABEL 1502 | FREQUENCY 1503 |
|---|---|---|
| TABLE 501 | SQL A | x |
| | SQL B | y |
| | SQL C | z |
| | ⋮ | |
| | SQL Z | a |
| TABLE 502 | SQL B | y |
| | SQL D | m |
| | SQL F | p |
| | ⋮ | |
| | SQL Y | b |
| TABLE 503 | SQL A | x |
| | SQL D | m |
| | SQL F | p |
| | ⋮ | |
| | SQL X | c |
| TABLE 504 | SQL W | n |
| | SQL N | y |
| | SQL T | a |
| | ⋮ | |
| | SQL | |

*Figure 15*

Select BOOK TITLE, PRICE
From BOOKS

Where AUTHOR = Kirk
And TOPIC = Computing

Predicate set = (AUTHOR & TOPIC)
Select List = (BOOK TITLE & PRICE)

Figure 17

Select BOOK TITLE, ISBN, STOCK
From BOOKS

Where SUB-TOPIC = Software Engineering
And AUTHOR = Ziegler, Jurgen

Predicate set = (SUB-TOPIC & AUTHOR)
Select List = (BOOK TITLE, ISBN & STOCK)

Figure 18

Select EMAIL ADDRESS
From CUSTOMER ADDRESSES

Where COUNTRY = United Kingdom

Predicate Set = (COUNTRY)
Select List = (EMAIL ADDRESS)

Figure 19

| Indexable Predicate Sets | Associated Select Lists |
|---|---|
| G A | E B |
| G A | E B C |
| G | A E |
| A E | B G |
| B C A | G E F |
| B C A | E G |
| A | B G F |
| A G B | E F |
| E G B A | C F |

*Figure 21*

| Indexable Predicate Sets |
|---|
| G A |
| G |
| A E |
| B C A |
| A |
| A B E |
| A G B |
| E G B A |

*Figure 20*

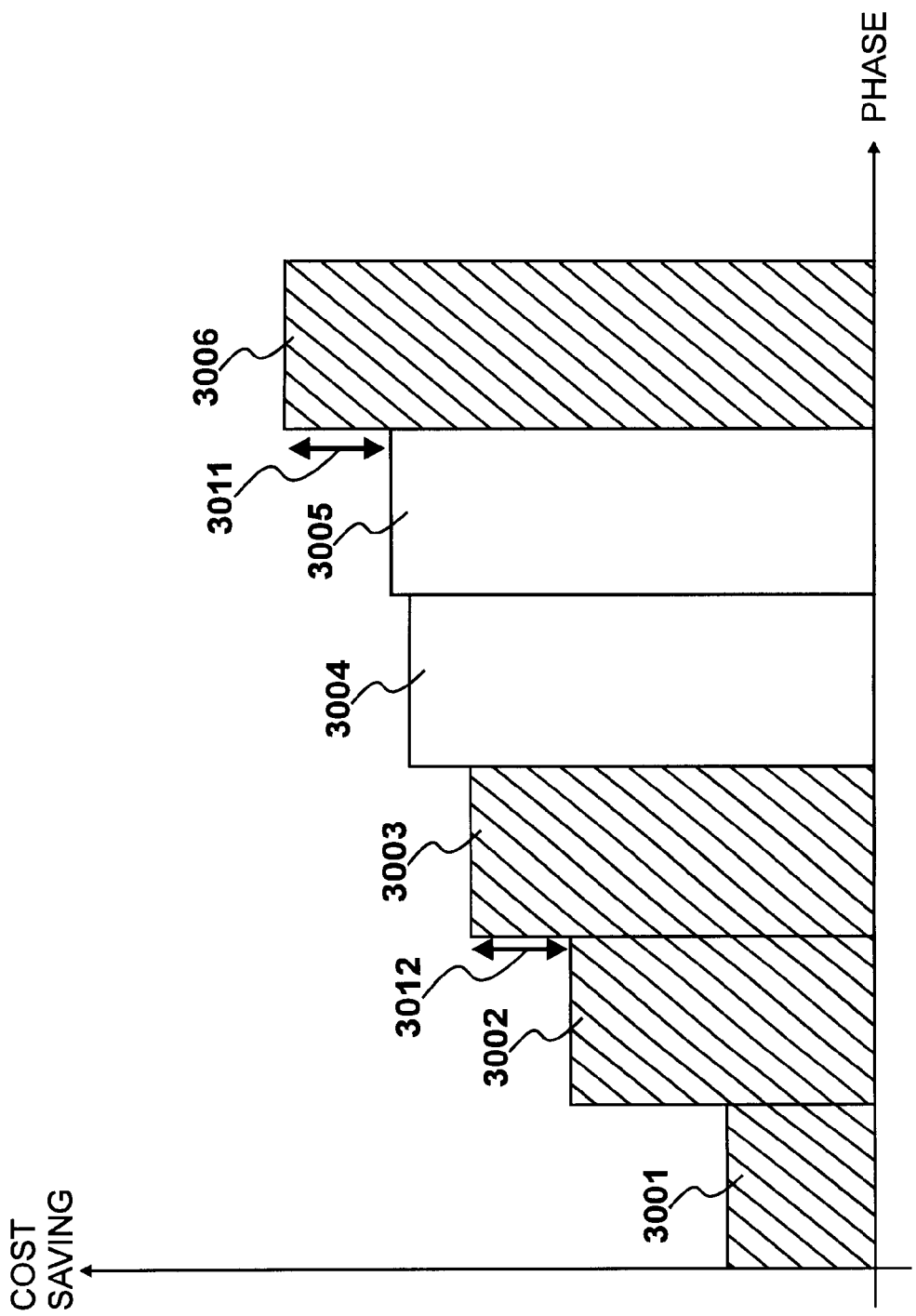

IDENTIFYING PREFERRED INDEXES FOR DATABASES

BACKGROUND OF THE INVENTION

1. Field of the Invention

The present invention relates to specifying indexes in a database in response to an analysis of received enquiries.

2. Description of the Related Art

Data processing environments are known in which executable instructions are arranged to generate a data set derived from data contained within a database in response to a data enquiry. Data may be accessed directly from data tables, where it is necessary to search the entries within a table in order to obtain the information required. As an alternative, indexes may be used, thereby avoiding the need for a time-consuming search, but increasing the amount of processing required whenever data is modified. Indexes also require additional data storage capacity.

Designing index structures for large and heavily used databases is presently an extremely difficult task and highly susceptible to the introduction of errors. This problem exists because the technical demands and constraints are such that it is not possible for a database administrator to simultaneously perceive the indexing requirements for hundreds or thousands of different structured query language (SQL) statements, that run against the database on a day-to-day basis. These requirements must then be converted into a preferred set of indexes defined over the whole database. A poorly specified set of indexes will result in SQL statements that consume far too much of the processor facility, that run for far longer than is theoretically necessary and result in a data processing environment that is heavily overloaded.

For a long time, there has been a requirement for procedures that globally specify index structures defined over a given database design, for a typical SQL workload, which may be referred to as a target workload. However, this technical problem has persisted given the inherent difficulties of realising a technical solution.

An earlier proposal of the present inventor is described in international patent publication number WO 97/22939, describing a procedure for specifying an index set by analysing a sample of SQL statements applied to the database. In this proposal, indexes are identified that could assist in the execution of the analysed statements and levels of improved operation are evaluated for each of the indexes. The evaluated levels are processed to specify an index set for inclusion in the database and storage is allocated, within an index being selected, on a prioritised basis.

A problem with the proposal identified in said earlier publication is that the size of the set of candidate indexes that must be evaluated to arrive at a preferred index set for the target workload becomes relatively large. In addition, the cost of developing a set of preferred indexes for each table using a genetic algorithm is also large. In combination, these problems result in a significant processor overhead requirement. Thus, the elapsed time taken to arrive at a preferred index set is prohibitively long, because there are so many candidate indexes. Furthermore, because of the genetic algorithm used in the earlier proposal, at least several hundred generations are required in order to arrive at a suitable set of preferred indexes for a particular table.

BRIEF SUMMARY OF THE INVENTION

The present invention provides a method of identifying preferred indexes for a database, wherein the database has received queries from users. A sample of user queries are analysed to identify candidate indexes. Index permutations are identified by processing candidate indexes in combinations identified from the sample of user queries. A preferred index set is then identified by comparing the performance of the index permutations.

Preferably, preferred indexes are identified for a database in a way such that earlier permutations of chosen indexes progressively guide and restrict the search path of the process. This in turn reduces processing time by many orders of magnitude when compared to known systems, without compromising the set of indexes identified.

The current invention uses techniques that dramatically reduce the search space for candidate indexes that need to be evaluated. In doing so, it also builds a set of preferred indexes for each table as part of its candidate index evaluation processing. This means that devising a set of preferred indexes for each table can complete many orders of magnitude faster than previously known systems. The current invention also by its nature builds a set of preferred indexes for each table as processing progresses, thus avoiding the expensive time and resource consuming need for known systems, such as the use of genetic algorithms, to devise a preferred index set for each table.

The invention also provides for apparatus for identifying preferred indexes, exploiting the aforesaid method and for a computer readable medium having computer readable instructions executable by a computer so as to exploit the aforesaid method.

BRIEF DESCRIPTION OF THE SEVERAL VIEWS OF THE DRAWINGS

FIG. 6 details the Books table shown in FIG. 5;

FIG. 9 details the Customer Addresses table shown in FIG. 5;

FIG. 15 illustrates the result of performing the steps shown in FIG. 14;

FIGS. 17, 18 and 19 illustrate the identification of indexable predicate sets and select lists shown in FIG. 16;

FIG. 20 illustrates indexable predicate sets identified in FIG. 16;

FIG. 21 illustrates select lists associated with indexable predicate sets identified in FIG. 16;

FIG. 30 illustrates the step of improvement processing shown in FIG. 24.

DETAILED DESCRIPTION OF THE INVENTION

Figure 1:
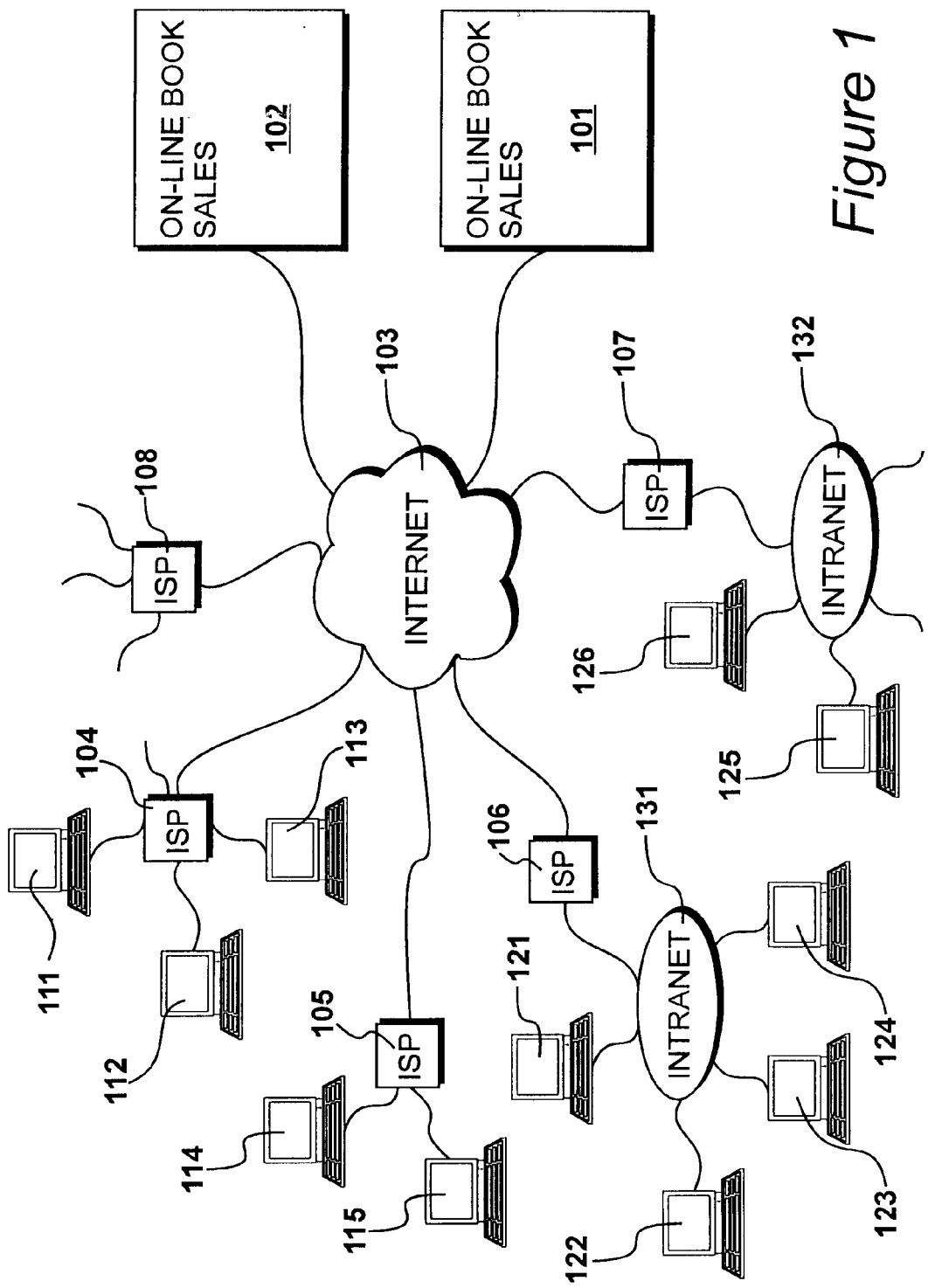
FIG. 1 shows a database environment, including an on line site.

A data distribution environment is shown in FIG. 1. A plurality of on-line services is provided, in which customers access services via the internet. A first on-line book sales provider 101 and a second on-line book sales provider 102 make available facilities for accessing information about books, and facilities for ordering books, over the internet 103. Internet service providers (ISP) 104 to 108 provide internet access for private individuals 111 to 115, and for corporate clients 121 to 126. Corporate sites include intranets 131 and 132, which communicate via an internet service provider 106 or 107.

The speed of internet-based services affects the efficiency with which internet hardware can be used. If a service provider 101 or 102 causes a delay in transactions performed over the internet, clients will be discouraged from using these facilities, as it results in loss of resources for the time of the delay.

An on-line book sales provider 101 must maintain a large database of information, including information about thousands, and possibly millions of books and customers. This information must be accessible to an on-line user with minimal delay. Maintenance of such a large database is difficult in terms of the computer operations that must be performed, and the complexity of instructions issued to control data maintenance operations. Careful set-up and maintenance is required in order to ensure that customer communication with the database is performed as quickly and efficiently as possible. If database access is significantly delayed, it is possible for the user to switch to an alternative book supplier thereby possibly, receiving information about a particular book from a competitor's site 102 more quickly than if the user had remained in communication with the original site 101.

Thus, in the environment illustrated in FIG. 1, database access has a critical effect upon the efficiency with which communications are effected across the available hardware.

Figure 2:
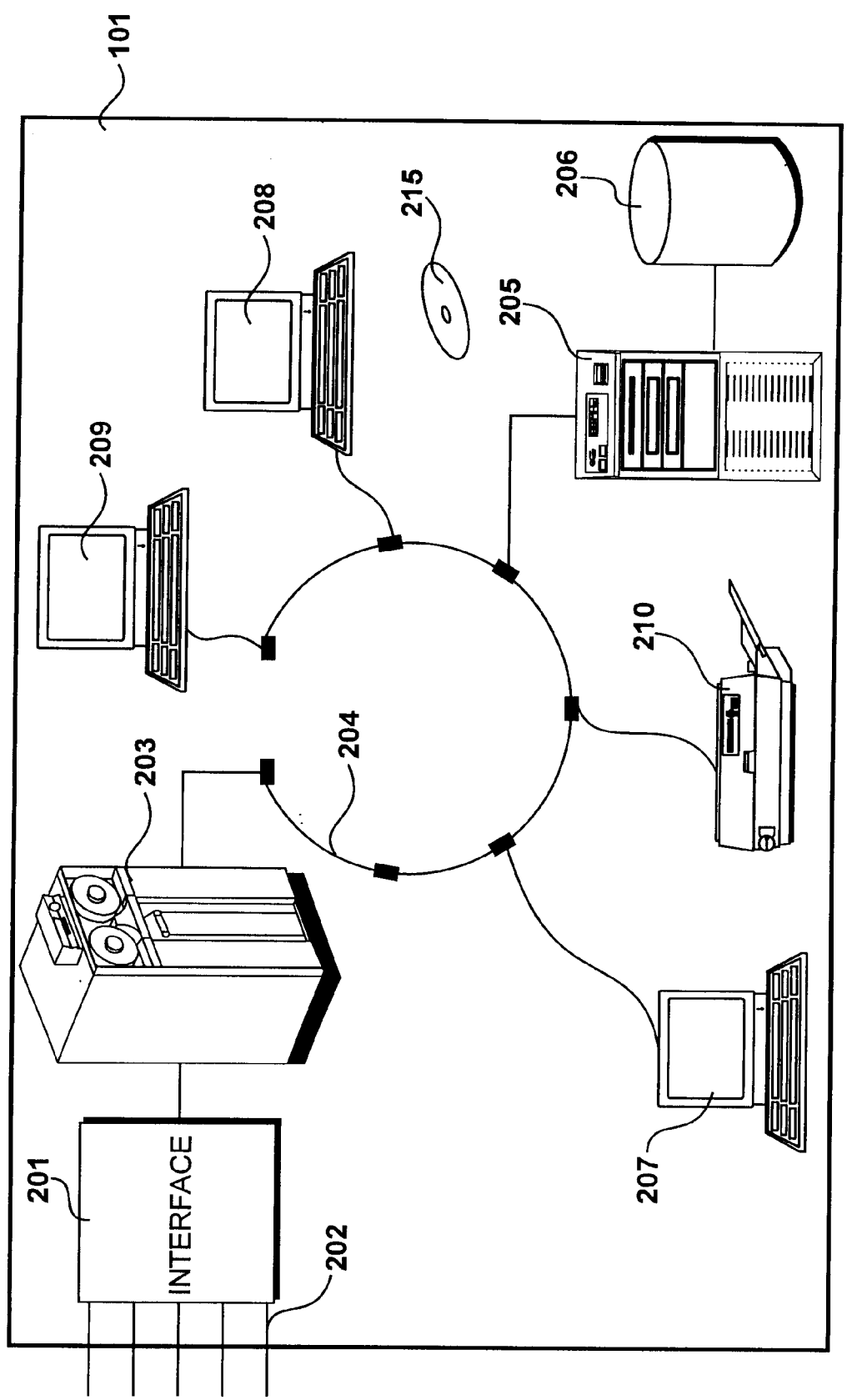
FIG. 2 details the on line site shown in FIG. 1, including a database server and hard disk storage for a database.

The first on-line book sales site 101, shown in FIG. 1, is detailed in FIG. 2. A high speed communications interface 201 receives and transmits data signals over high capacity transmission cables 202, that provide communication with the internet. An Internet server computer 203 encodes, decodes and buffers internet communications, which may then be established with a variety of peripherals on an internal high bandwidth network 204. A database server computer 205 communicates with high capacity hard disk storage unit 206. The database of books may be considered as residing permanently on the disk store 206, but at least partially residing in a dynamic memory cache within the database server computer 205. Furthermore, the database operates with respect to a set of instructions that are executed by the database server 205, that may be considered as a set of methods for accessing data in response to a user query. Database server 205 is typically a computer system operating under an appropriate operating system, such as UNIX and executing a database management system, such as DB2. In addition programs are loaded into database server 205 via a suitable instruction carrying medium, such as a CD ROM 215, thereby programming the system to perform procedures for identifying preferred indexes as described herein.

Also connected to the high bandwidth network 204 are terminals 207, 208 and 209, that may be used by database engineers and system administrators, in order to maintain the database of books held on the hard disk store 206. Furthermore, terminals 207, 208 and 209 may be used to gain access to the procedures and control structures that are used within the database server 205, in order to attempt to ensure that the database is operating at the highest possible level of efficiency. A printer 210 may receive instructions to generate a hard-copy of database information, including statistics about customer access patterns.

Figure 3:
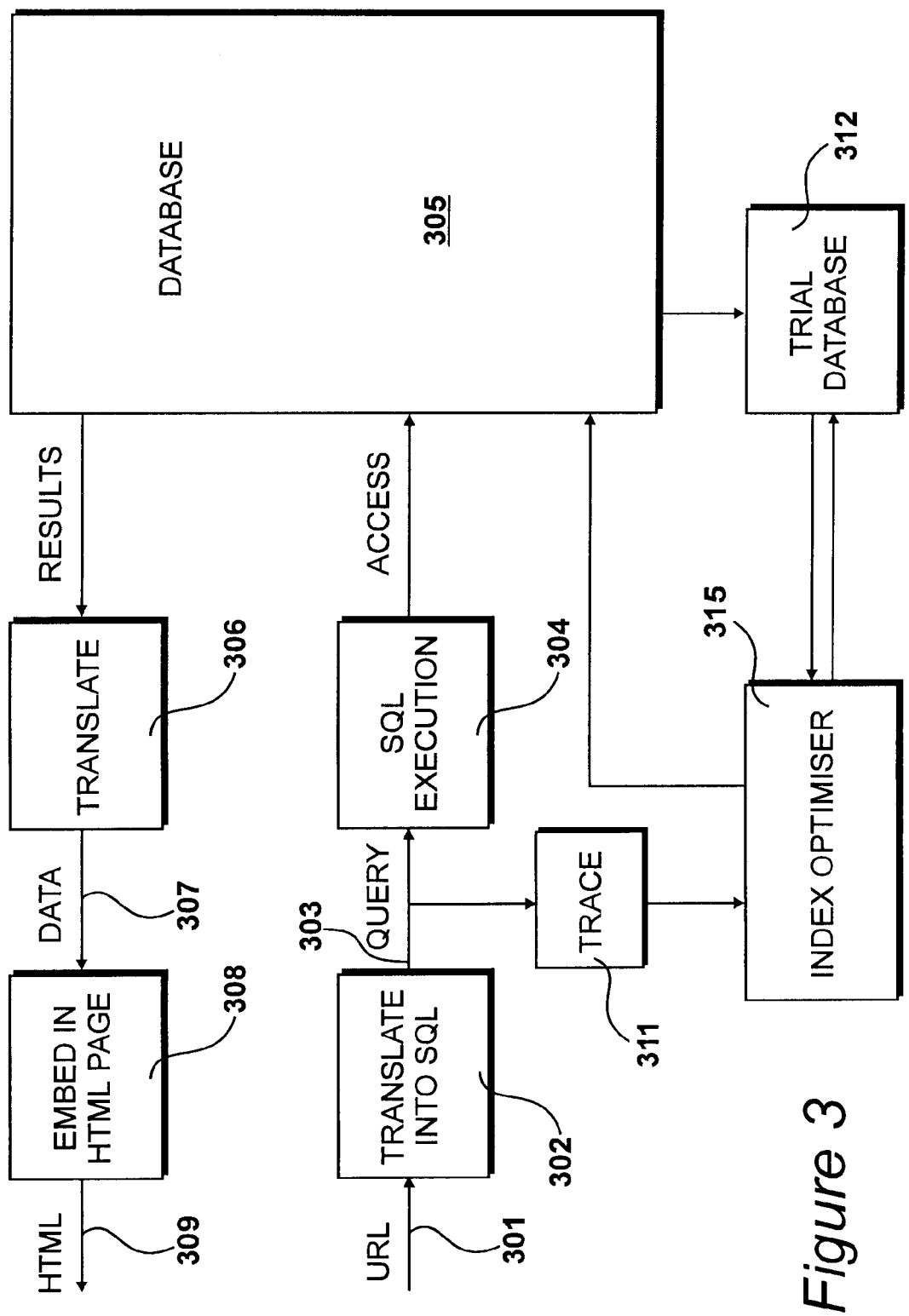
FIG. 3 illustrates data access procedures performed at the on line site shown in FIG. 2, including a database and a process for optimising indexes.

Operations performed by the hardware shown in FIG. 2 are summarised in FIG. 3. User queries are transmitted over the Internet in a Universal Resource Locator (URL) string. A URL specifies a universal address for a data resource anywhere on the internet. In addition to specifying an address, character codes may be appended to the address field in order to specify a site-specific operation, for example, to search for a book title.

A URL 301 is received by the internet server 203, and passed to the database server 205 via the network 204. In a process 302, the database server 205 translates the URL into a structured query language (SQL) statement 303. SQL is a standard set of instructions for defining interactions and requests with a database. Thus, the DB2 instructions executed by the database server 205 is configured to respond to SQL queries received over the Internet.

The SQL representation of the user request is executed by an SQL execution process 304. This process interprets the SQL, and generates instructions to access the database 305, in order to find information relating to the book title. Results from the database are supplied to a translation process 306, that removes unnecessary character codes, and supplies results data 307 to a final process 308, where the results of the search are embedded into a page of HTML. Signals 309 representing the page of HTML are supplied over the network 204 to the internet server 203. Signals are transmitted back across the Internet to the user who made the query, and the results are displayed as a page on an internet browser program running on the user's computer.

In many cases, this sequence of operations is carried out in a few seconds. However, the database 305 contains records for over a million books and possibly several million customers. Searching a million book records every time a user transmits a query over the internet, although technically feasible, is a highly inefficient use of resources, and indexes are used in order to ensure that records may be accessed without always needing to perform a complete database search.

An index may be provided, for example, that enables quick access to a book record, when its title is known. Several indexes may be used in order to optimise database access in this way, for a variety of different search criteria. However, an index takes up substantial space on the hard disk store 206, and slows down operations for adding or removing records from the database. Thus, the addition of indexes, although speeding up customer access, also has a significant overall systems cost in other respects, such as the time required for addition, update or deletion of records in the database, and the amount of storage required.

Optional processes operating on the database server 205 include a process of tracing SQL, in which a copy is made of all the SQL queries supplied to the SQL execution process 304 over a selected period of time. A trial database 312 is generated from the main database 305, in a process known as cloning. An index optimiser process 315 utilises these two sources 311 and 312 of data in order to determine a preferred set of indexes for the database 305, taking into account the advantages and disadvantages offered by various types of index. In this way, an optimal set of indexes is specified for the system's recorded pattern of data access, and for the particular design of database.

Figure 4A:
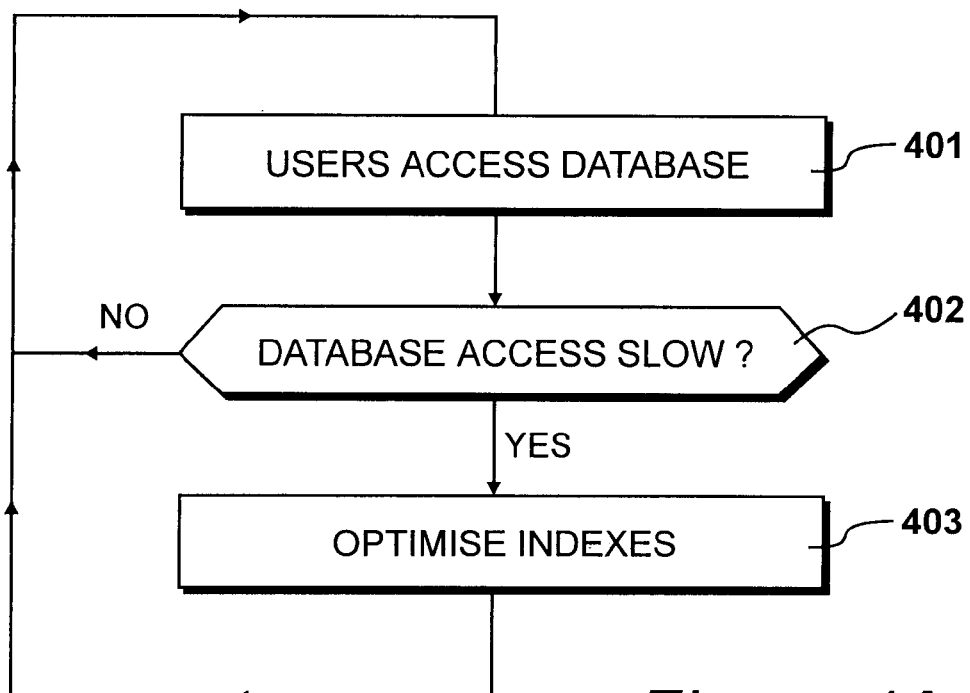
FIGS. 4A and 4B detail operations carried out on the on line site shown in FIG. 2, including the process of optimising indexes shown in FIG. 3.
Figure 4B:
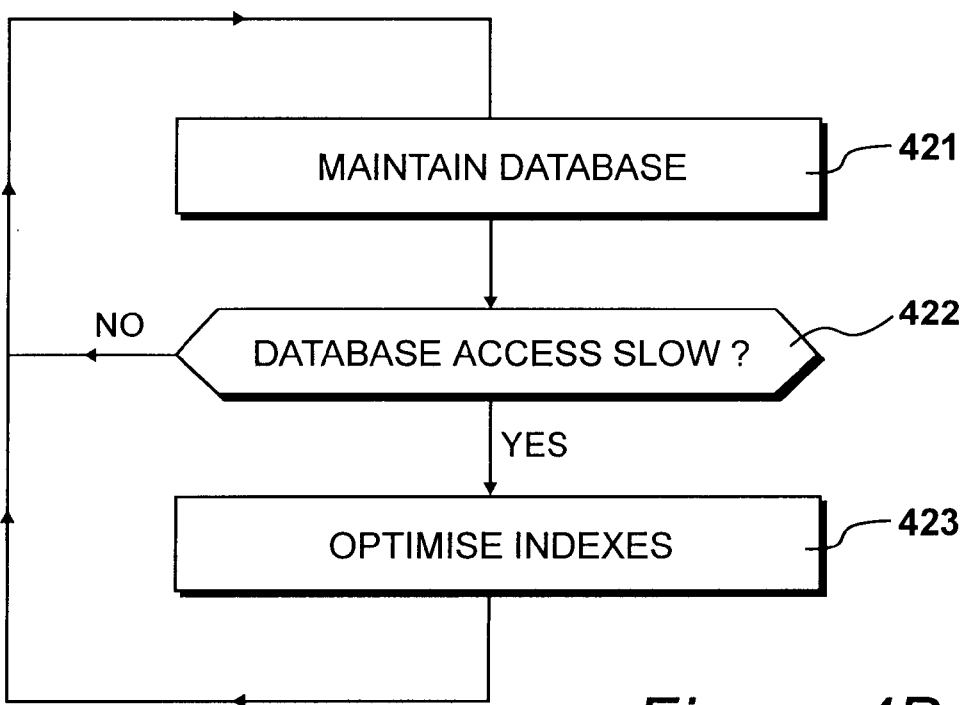

The context of operation of the index optimiser is illustrated in FIGS. 4A and 4B. In FIG. 4A, at step 401, users access the database via the internet 103. At step 402, a question is asked as to whether database access, in response to customer requests, is significantly slow. Customer requests may include requests for information, in the form of a query, or a request for an order to be placed. If database access is not significantly slow, control is directed to step 401. Alternatively, control is directed to step 403, where index optimisation is performed. Thereafter, control is directed to step 401. The process of optimising indexes 403 may be performed as a separate task on the database server 205, or, alternatively, other database hardware connected to the network 204 may be used to perform index optimisation, so that users can continue to access the database via the database server 205. Thereafter, when the set of preferred indexes has been provided, and the main database 305 updated, will users experience an increased in speed of access.

In FIG. 4B, at step 421, the database is maintained. This includes the addition of new records for books, removal of book records, or other operations on the database 305 resulting in the addition or removal of records. Maintenance of this kind may be performed on a terminal on the network 204, or alternatively remotely via the internet, using secure access protocols. Also included in database maintenance 421, are the addition or removal of customer records and orders, that can result from a customer placing or removing an order for a book. At step 422 a question is asked as to whether database access when adding or deleting records is slow. If not, control is directed to step 421, and maintenance is continued. Alternatively, index optimisation is commenced at step 423, and executed as a background operation until optimal indexes have been specified, at which time the process of maintenance 421 speeds up.

Figure 5:
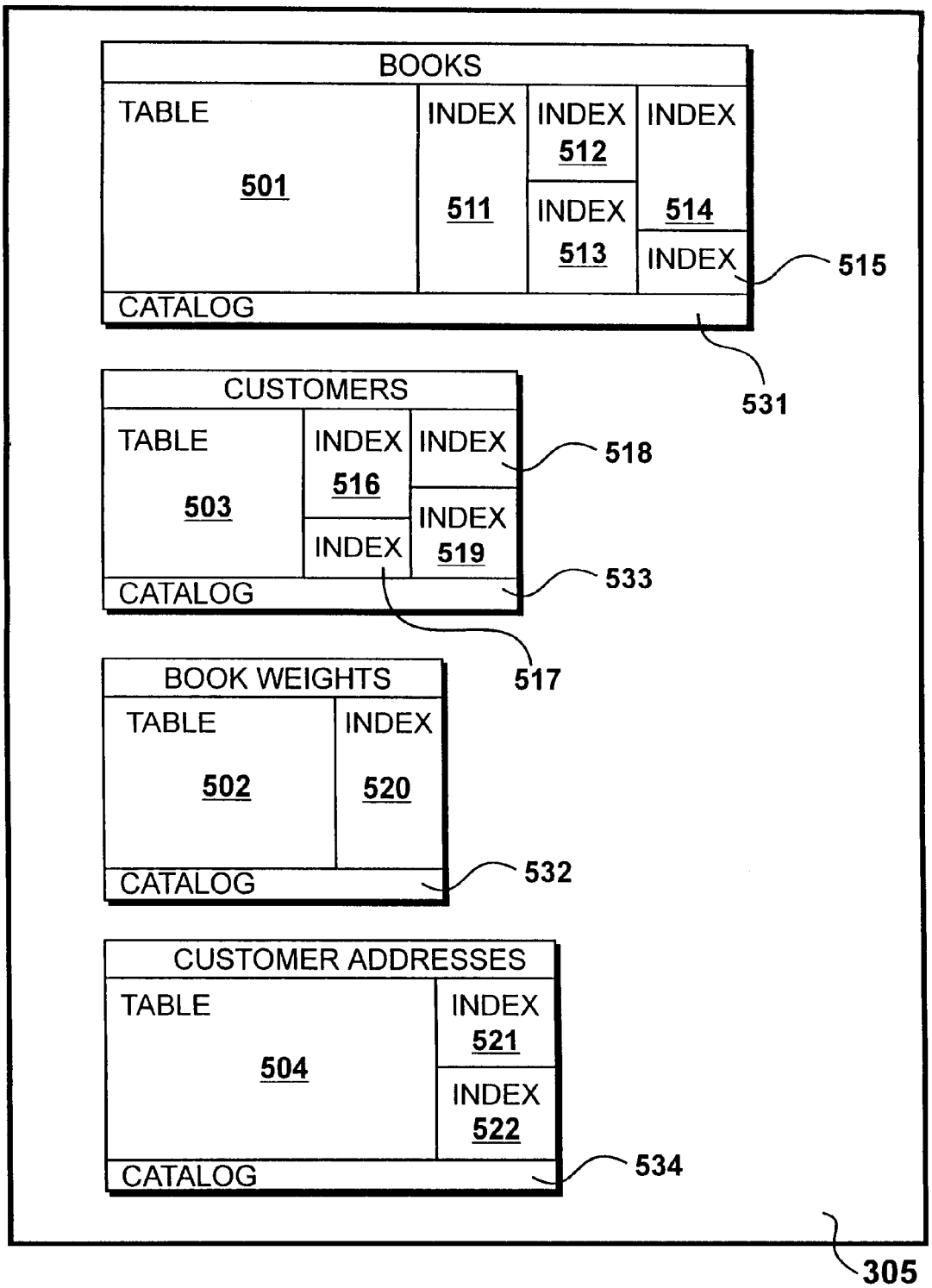
FIG. 5 details the database shown in FIG. 3, including a Books table, a Customers table, a Book Weights table and a Customer Addresses table, and indexes.

The database 305, shown in FIG. 3, is detailed in FIG. 5. Most modern databases are relational databases. In a relational database, several tables are present. Records in a first table, such as the Books table 501, include a column, such as a column for an ISBN number, that is also present in a different table, such as the Book Weights table 502. Thus, a customer accessing details of a book in table 501, may then access a record for the same book in table 502 in order to determine its weight, and therefore the cost of postage when the book is ordered. Data is stored linking tables 501 and 502, to provide quick access to related data. Typically there are many tables in a relational database. In FIG. 5, a Customers table 503 and a Customer Addresses table 504 are provided. Indexes are provided for the tables in order to speed up response to common database queries.

Each table 501 to 504 also has catalog information 531 to 534. The catalog provides information about the nature and distribution of data, which can be used in a process of SQL optimisation. An SQL query may usually be satisfied by accessing a database in several ways. Catalog information makes it possible to predict which of the possible ways is likely to be most efficient, and thus the best way can then be selected. The SQL execution process 304 uses catalog information to select the best method for executing an SQL statement 303. This is known as access optimisation. This may be performed dynamically, selecting the best method when the SQL is received. Additionally, static optimisation is used, where a predetermined best method is always used in response to satisfy a particular type of SQL query.

Also shown in FIG. 5 are indexes 511 to 522, that are associated with the various tables. Indexes have a significant impact on the efficiency of data access, because they provide quick access to table data, and sometimes remove the need to access a table altogether. The presence and structure of indexes is taken into account during the process of static and dynamic access optimisation performed by the SQL execution process 304.

Figure 7:
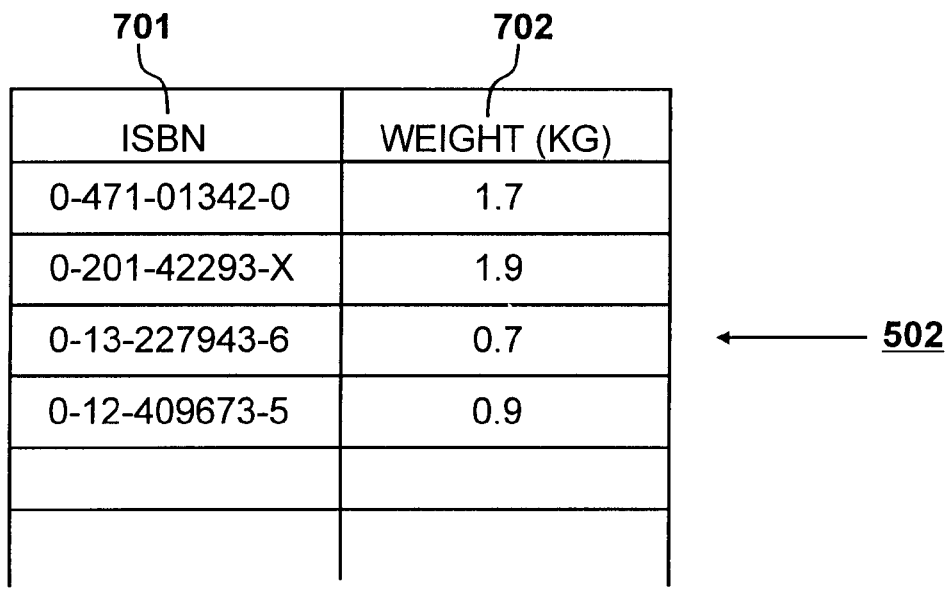
FIG. 7 details the Book Weights table shown in FIG. 5.
Figure 8:
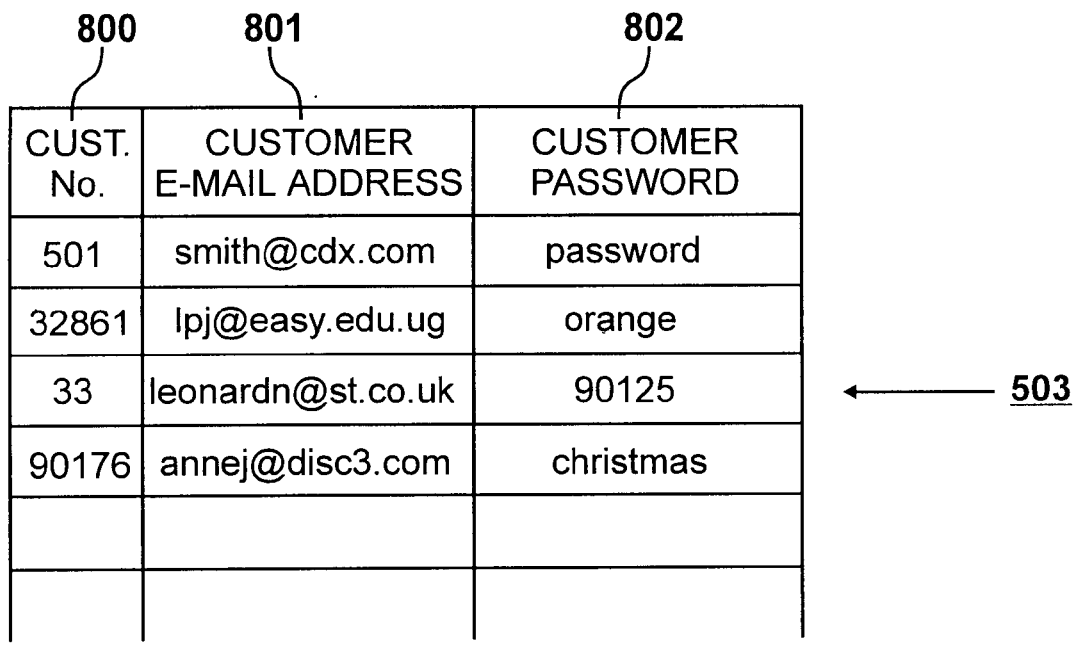
FIG. 8 details the Customers table shown in FIG. 5.

The Books table 501 is illustrated in FIG. 6. There are nine columns, including Book Title 601, Author 602, ISBN 603, Topic 604, Sub-Topic 605, Price 606, Number Sold 607, Stock level 608 and In Print 609. Rows 611 upwards each contain an individual book record. FIG. 7 details the Book Weights table 502, including a column for ISBN 701 and the weight of the book 702 in kilograms. FIG. 8 details the Customers table 503 shown in FIG. 5, including a Customer Number 800, a Customer email Address 801, and a Customer Password 802. FIG. 9 details the Customer Addresses table 504 shown in FIG. 5, including columns for Customer Number 901, House Number 902, Street 903, Town 904 and Country 905. Using the Customers table 503 it is possible to look up a customer's password from their customer number. If an order for a book is eventually placed, the relevant address details for the customer can be obtained from the Customer Addresses table 504.

The difficulty of data access can be seen by way of an example with reference to FIG. 6. A common way of finding information from an on-line book site is to supply an author's name. The Author's name is specified in column 602 of the Books table 501. There are over a million books in table 601, so checking column 602 in each record is an extremely resource-intensive process. Inevitably, using this mode of access, a significant delay in obtaining results will be experienced by a user. Given that the author's name is a common way of accessing data, a database engineer is likely to identify this as being suitable for indexing. Instructions can be issued to the database server to create an index, such as index 511, on the database 305, so that the speed of a subsequent access via author's name will be significantly improved.

Figure 10:
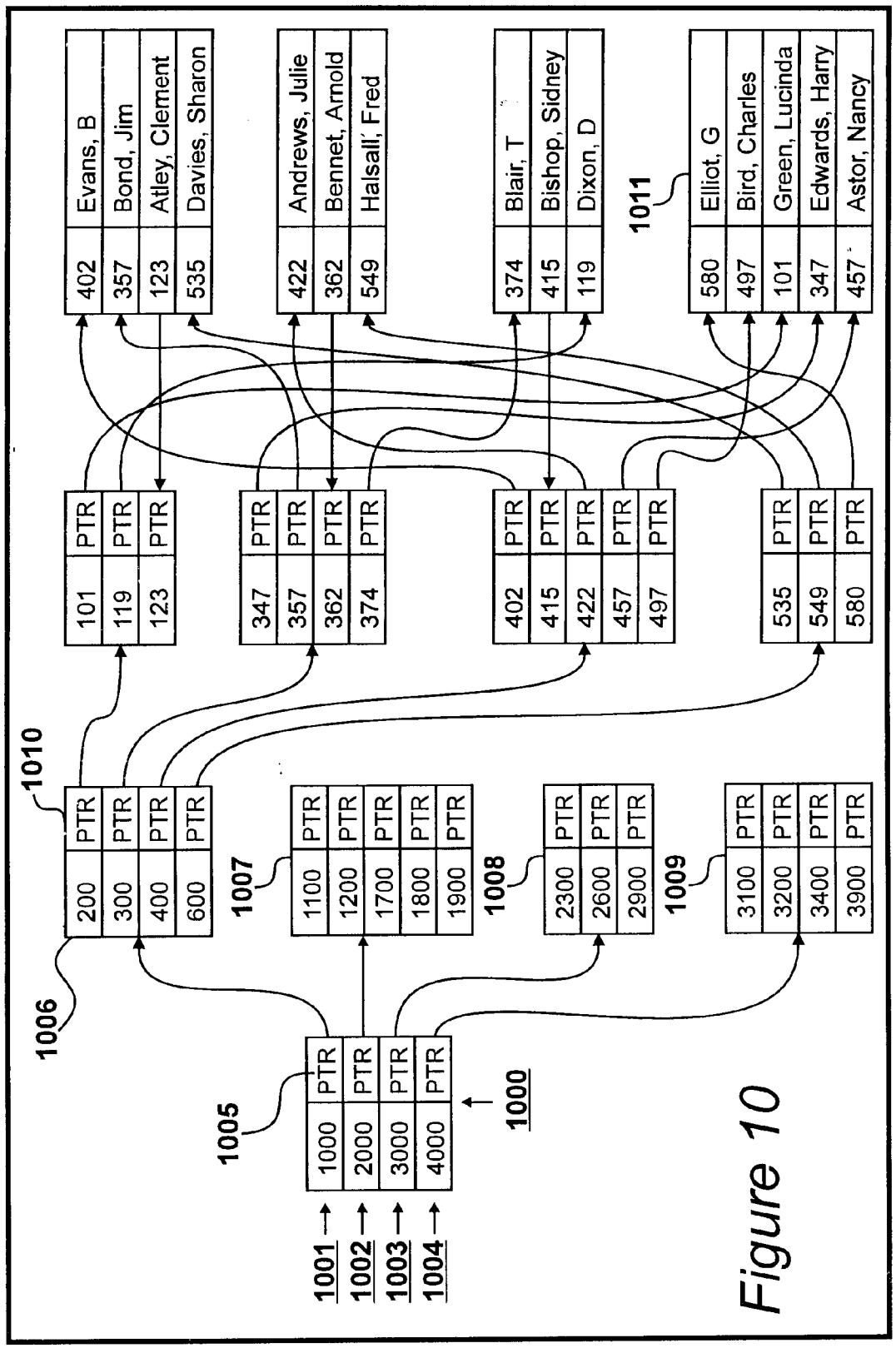
FIG. 10 shows an example of an index structure of the type shown in FIG. 5.

An example of the structure of an index is shown in FIG. 10. A root page 1000 includes a first individual record 1001 containing a data value of one thousand, and an associated pointer. The pointer 1005 points to a first non-leaf page 1006, containing records with data values that are less than one thousand. Additional records 1002 to 1004 in the root page 1001 have data values of two, three and four thousand. Their pointers point to non-leaf pages 1007, 1008 and 1009, that each contain several records, each containing data no greater than the value in the respective record in the root page.

Each pointer in a record in a non-leaf page points to a leaf page, and each leaf page contains several more records. For example leaf page 1010 contains records with data values that exactly match the data values in records of the table itself. Because the order of the data in the table is unrelated to the index key, the index is said to be a non-clustering index. The pointers in the leaf pages point directly to records, or rows of data, in the table, which include not only the key upon which the index is based, but also associated data. In the example shown in FIG. 10, customer names are shown along with customer numbers, and the index key is the customer number.

If customer number is a frequently used key for obtaining data from a table, an index of the type shown in FIG. 10 facilitates an increase in the speed with which an individual customer's record may be identified. Initially, given the customer number, the root page 1000 is examined to select an appropriate non-leaf page. The non-leaf page is quickly identified, even if there are hundreds or thousands of records in the root page, using a binary chop search. The same approach is adopted for the non-leaf pages 1006 to 1009, resulting in an identification of a leaf page, and finally a data record, or row in the table, in which customer data is stored. Traversing the tree structure of the index is far quicker than searching through the data records in the database one by one. The arrangement shown in FIG. 10 is highly simplified, and the three-level structure that is shown may provide indexing to many millions of customer records. A two level structure may be used, for smaller databases, in which the non-leaf pages 1006 to 1009 are omitted.

The index shown in FIG. 10 is a single column index. This is one in which a single column, in this case customer number, provides the key. Multiple column indexes are also possible. A typical example of a useful multiple column index is one that specifies topic 604 with author's name 602. The tree structure is used to provide maximum speed of access, where sufficient information is provided. Alternatively, partially specified information in those categories can be compared with entries in the leaf pages of the index, allowing a quicker search to be performed than when the table itself is scanned. This is due to the fact that the amount of data stored in the leaf pages is still smaller than the amount of data in the table, therefore less disk access is required.

Multi-column indexes provide a significant additional mode of access, known as index-only access. In some circumstances, it may be required to know the topic under which an author's books have been categorized. In this case, it is possible to specify the author, search the index, and find the topic or topics associated with that name. Consequently, data is retrieved without accessing the main table 501. When a multi-column index has many columns, index-only access becomes increasingly probable, and is an extremely effective way of reducing data access times.

The SQL access optimiser considers index structures in its determination of the most efficient method for satisfying an SQL statement. If index only access can be used, the DB2 optimizer will usually choose this method in preference to accessing a main table such as main table 501. This provides an additional level of complexity when evaluating the potential advantage of using a particular set of indexes. A disadvantage of multi-column indexes is that they take up considerable disk space. If all columns are indexed, then the index will take more space than the original table.

The index optimizer 315, shown in FIG. 3, receives incoming SQL queries, analyses SQL queries with a cut-down trial version 312 of the main database 305, and generates a preferred set of indexes for optimal database access. Once identified, these preferred indexes are transferred to the main database. Thereafter, operations with the database require less hardware processing, and execute more rapidly. Furthermore, the improved efficiency results in a more responsive turnaround of customer access.

Index optimisation occurs at step 403 in FIG. 4A and step 423 in FIG. 4B. The process of index optimisation is summarised in FIG. 11. At step 1101 data structures required for index optimisation are prepared. At step 1102 preferred indexes are identified. At step 1103 the main database 305 is reconfigured to operate with the preferred indexes identified at step 1102.

Figure 11:
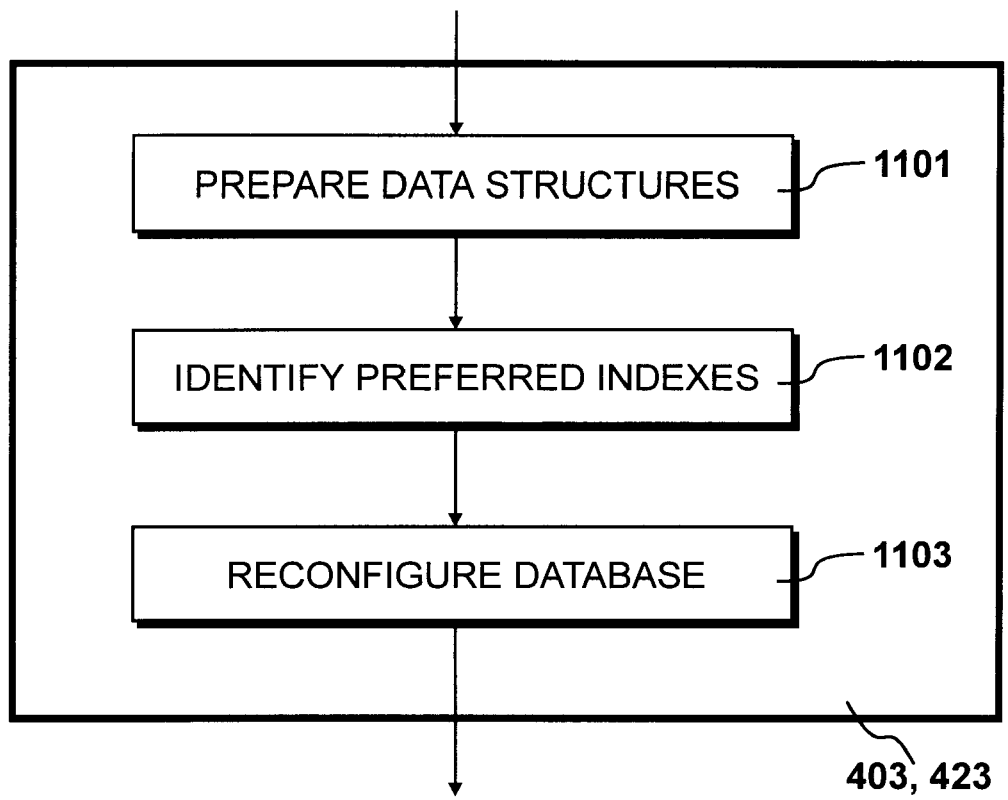
FIG. 11 summarises the process of index optimisation identified in FIGS. 4A and 4B, including steps of preparing data structures, identifying preferred indexes and reconfiguring the database.
Figure 12:
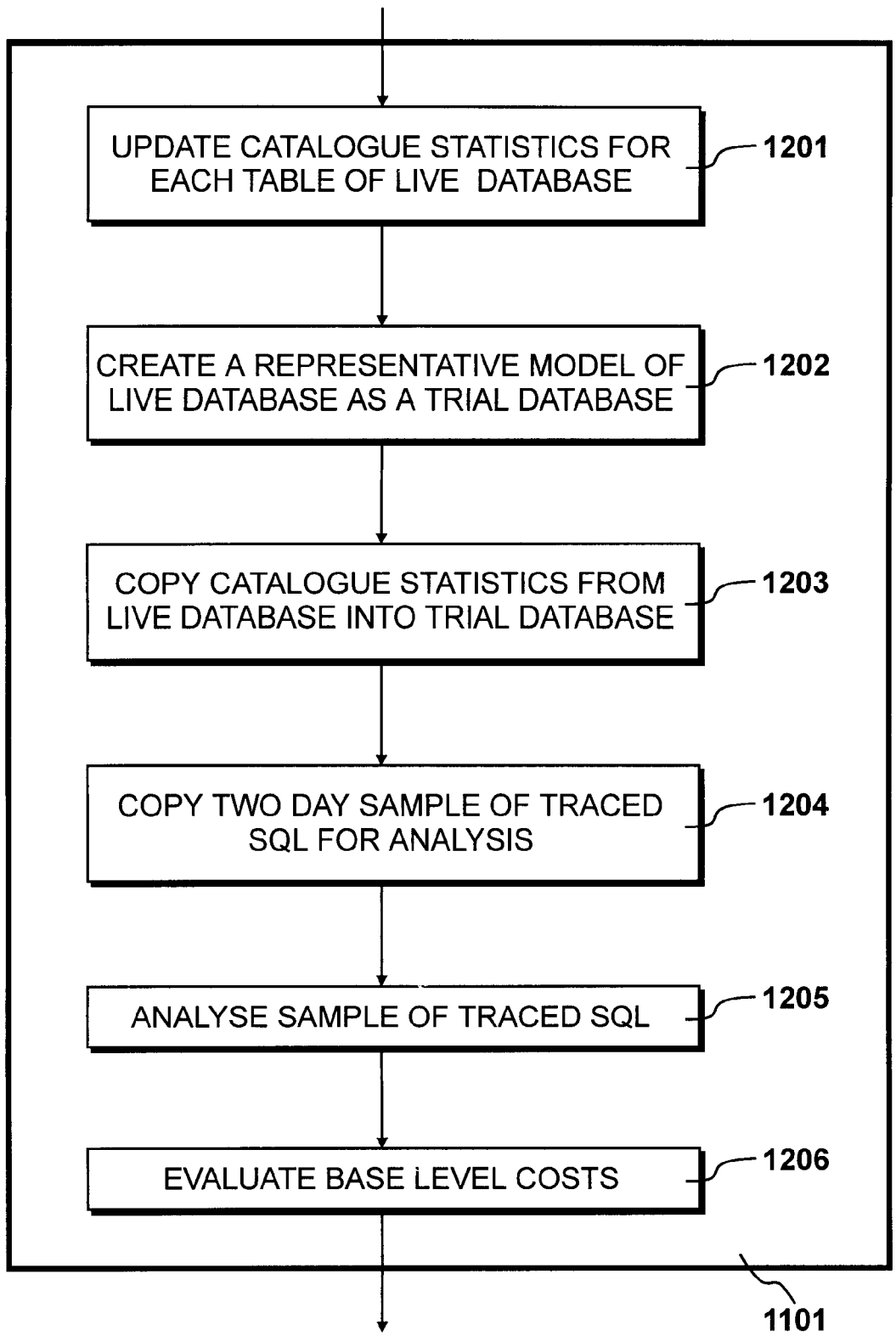
FIG. 12 details the step of preparing data structures shown in FIG. 11, including steps of creating a trial database and analysing a sample of traced SQL.

The step of preparing data structures 1101 shown in FIG. 11 is detailed in FIG. 12. At step 1201 catalog statistics are updated for each table 531 to 534 of the database 305. Catalog statistics describe the nature of the data in the table concerned to the DB2 optimizer in order to determine the most efficient method for satisfying an incoming SQL statement. The characteristics of each table and index change over time, as new records are added or old records deleted. This can have an effect on the efficiency of different modes of data access.

For example, a catalog statistic called the cluster ratio provides an indication of how well the ordering of data in an index follows the ordering of the data in the originating table. A clustering index accesses a table that is physically stored in the order of the index key, for example, author name. Every row in the table is in alphabetical sequence and the cluster ratio may be considered as being one hundred per cent when the data has been re-organised in clustering sequence. Non-clustering indexes access tables that have a storage order of data that is unrelated to the clustering index. For a non-clustering index, the cluster ratio will be less than or equal to one hundred percent. As rows are inserted and deleted from a table the cluster ratio of a clustering index will gradually decline as more and more rows go out of clustering sequence. This has an impact upon the speed with which data can be accessed.

Another example of a catalog statistic is cardinality. This is a measure of the number of different data values. Cardinality may be specified for a table column, such as column 609. This column specifies whether a book is in print or not, taking a value of either "yes" or "no". The cardinality for this column is two. The cardinality of the ISBN column 603 is equal to the total number of books in the table. Other columns have cardinality values in between these two extremes. Full key cardinality is the overall cardinality of an index, and specifies the number of different entries possible of an index for a table, and may be less than or equal to the number of rows in a table, or the table cardinality.

Cardinality and other characteristics change as records are added and deleted. In order to ensure that the SQL execution process 304 is operating using up-to-date statistics, it is necessary for a system administrator to issue a command via one of the terminals 207 to 209 to collect and update the catalog statistics for each table. The DB2 command for this is "RUNSTATS", after which each table's data is examined, and its respective catalog statistics are updated. Step 1201 in FIG. 12 executes this command, in order to ensure that catalog statistics are up to date, as they will be used in subsequent processing to identify preferred indexes.

A trial database 312 is generated from the live database 305 at step 1202. The trial database has characteristics that are statistically very similar to the main database 305. However, the process of testing the performance of candidate indexes is greatly speeded up by using a representative sample of live data upon which tests are performed, rather than using a copy of the entire database. Thus, providing that the trial database is statistically similar to the main database 305, the process of index optimisation can be carried out in a much shorter time than would otherwise be the case.

At step 1203 the catalog statistics of the live database 305 are copied to the trial database 312. This step is performed in preference to executing a RUNSTATS command on the trial database. The purpose of this is to ensure that decisions taken during trial SQL execution are substantially the same as those that would be taken if all the data of the main database 305 were present.

A two day sample of traced SQL is copied at step 1204. The most recent two days are considered to be a good representation of patterns of database access that can be expected in the future. Thus a set of indexes that are optimal for this sample of SQL can be expected to be optimal in the near future. This sample is copied for use by the index optimiser 315. At step 1205, the sample of SQL is analysed. At step 1206 base level costs, also known as default costs, are evaluated for each table. The default costs are determined by obtaining a cost for each statement of SQL and multiplying this by its frequency of use with respect to a particular table. The cost per statement is obtained automatically using cost estimate evaluation procedures provided within the DB2 environment. These values are then summed to give the overall default cost for the table, in which only default indexes are present.

Figure 13:
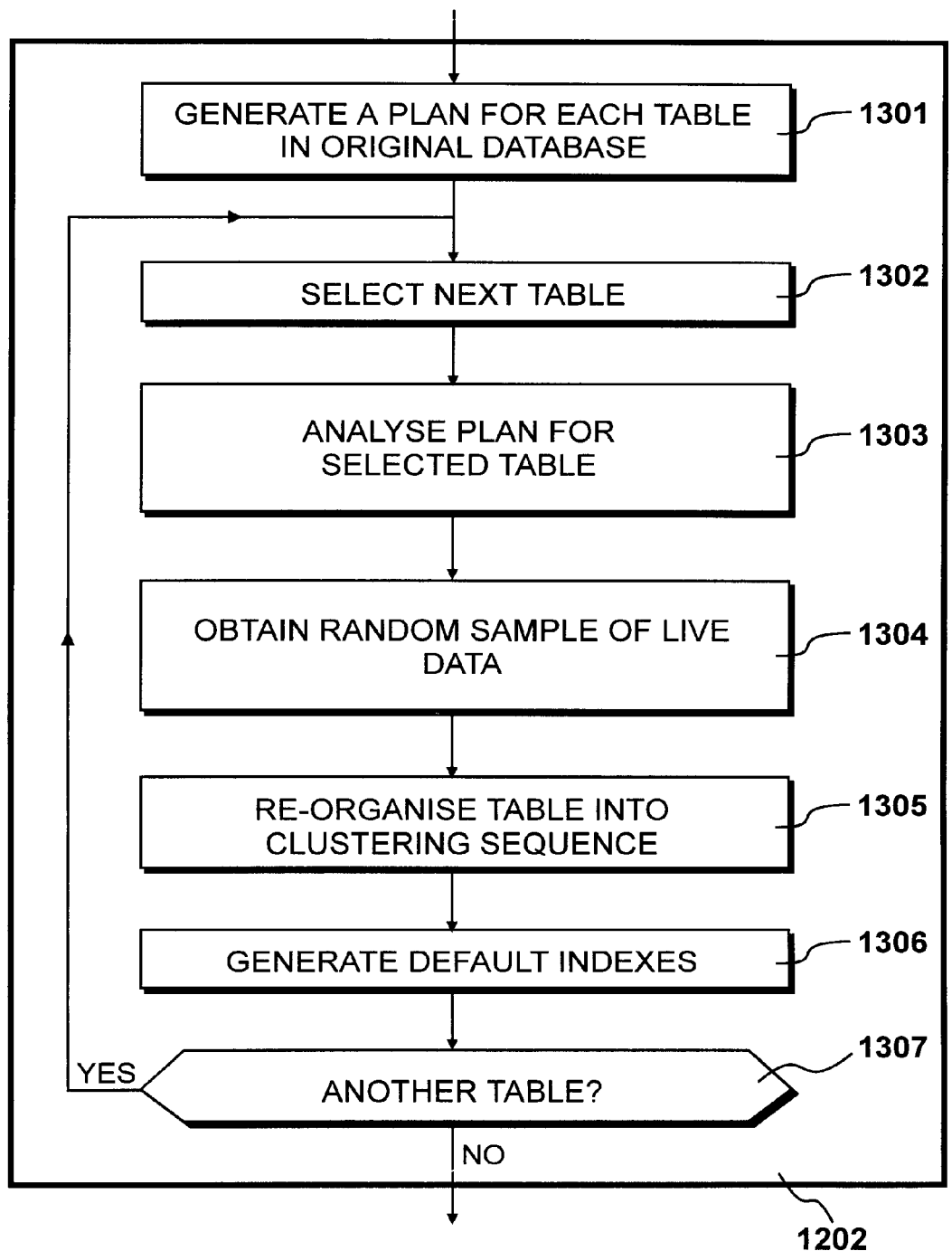
FIG. 13 details the step of creating a trial database shown in FIG. 12.

The step 1202 of creating a trial database is detailed in FIG. 13. At step 1301 a plan is generated for each table 501, 502, 503 and 504 in the original database. The plan for a table contains a list of SQL statements that result in a reference being made to that table. At step 1302 the next table is selected, and steps 1303 to 1306 are performed with respect to the table selected at step 1302. At step 1303 the plan for the selected table is analysed, so that each SQL statement that is listed in the plan is given a unique ID. In later processes, this enables access to the SQL statements for a particular table to be performed without the need to re-analyse all the SQL, and access to SQL statements with respect to a given table is necessary during the steps required for generating the preferred index set.

At step 1304 a random sample of live data is obtained from the original table in the database and the corresponding table in the trial database is populated. The maximum size of the live table is one hundred thousand rows. This size restriction is imposed so that performance measurements may be made efficiently in later stages for identifying the preferred index set. The random data is obtained by determining a fractional row increment value that are given by the number of rows in the original table of the live database divided by one hundred thousand. For example, if the live table contains one hundred and fifty thousand rows, the increment is 1.5, resulting in rows one, two, four, five, seven, eight, and so on, being copied to the table in the trial database. If less than one hundred thousand rows is present, the entire table is copied.

At step 1305 the table populated at step 1304 is reorganised into clustering sequence, and at step 1306 the default indexes for the table are created. These are the primary, clustering and foreign key indexes. The catalog is updated with live statistics for these indexes. At step 1307 a question is asked as to whether another table is to be considered. If so, control is directed to step 1302. Alternatively, all tables have been considered, and the trial database 312 has been created.

Figure 14:
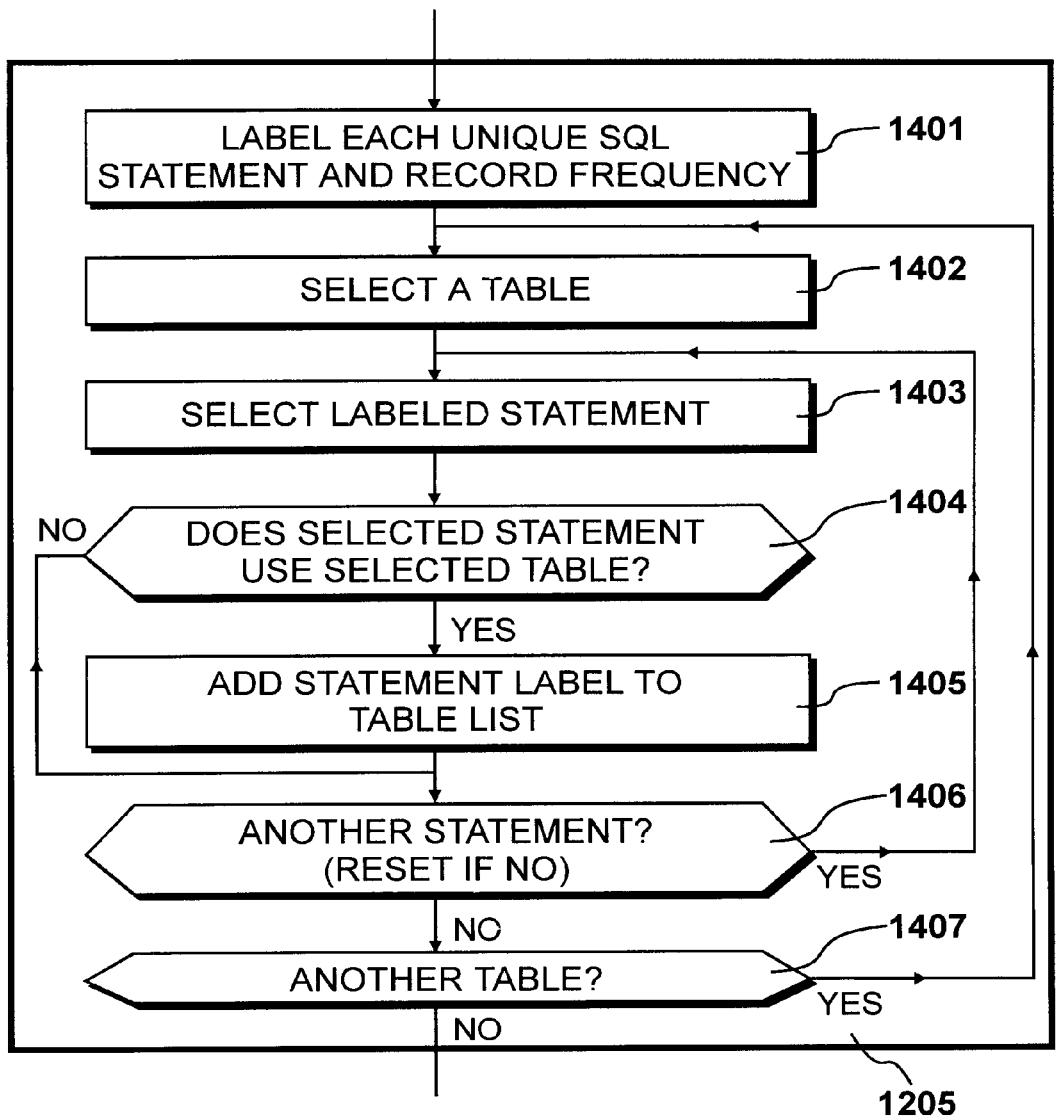
FIG. 14 details the step of analysing a sample of trial SQL shown in FIG. 12.

Analysis of the sample of traced SQL carried out at step 1205 in FIG. 12 is detailed in FIG. 14. At step 1401 an SQL statement is processed to determine whether it is the first occurrence of a particular statement or whether the statement has been processed before. Thus, each unique SQL statement is given a unique label and if the same SQL statement is identified again, the number of occurrences is recorded in a frequency column.

At step 1402 a table is selected and at step 1403 an SQL statement, labelled at step 1401, is identified. Thus, procedures 1403 to 1406 are only performed for each unique occurrence of a captured statement.

At step 1404 a question is asked as to whether the statement selected at step 1403 makes use of the table selected at step 1402. If the question is answered in the affirmative, the statement label is added to the appropriate table list at step 1405. Alternatively, if the question asked at step 1404 is answered in the negative, step 1405 is bypassed, with control being directed to step 1406.

At step 1406, a question is asked as to whether another statement is to be considered and if answered in the affirmative control is returned to step 1403, allowing the next labelled statement to be selected. Alternatively, if answered in the negative, to the effect that no further statements are available, a statement identifying pointer is reset and control is directed to step 1407. At step 1407 a question is asked as to whether another table is present and if answered in the affirmative, control is returned to step 1402 for the next table to be selected.

Eventually, all of the tables will have been considered resulting in the question asked at step 1407 being answered in the negative.

The table list generated at step 1405 is detailed in FIG. 15. The list consists of a first column 1501 identifying an originating table, a second column 1502 identifying SQL statements, in terms of their labels as specified at step 1401 and a third column 1503 identifying statement frequency, that is, the number of times a particular SQL statement occurs within the traced set.

As shown in FIG. 15, Table 501 has been selected first at step 1402, resulting in SQL statements A, B, C etc to SQL Z being added to the table list in response to repeated operations at step 1405. Thereafter, Table 502 has been selected, resulting in SQL labels being identified with this table. Table 503 is selected, and, finally, Table 504 has been selected. In the present example, four tables are present but it should be appreciated that any number of tables may be present as used within large relational databases.

In the third column 1503 the frequency of occurrences have been recorded which, typically, would be measured in thousands. Thus, x occurrences have been recorded against statement A, y occurrences have been recorded against statement B and z occurrences have been recorded against statement C, etc.

FIGS. 12 to 15 complete the description for step 1101 in FIG. 11, in which data structures are prepared. The identification of preferred indexes at step 1102 is summarised in FIG. 16. At step 1601 a first table is selected. At step 1602 indexable predicate sets and associated select lists are identified for the table selected at step 1601. At step 1603 a preferred index set is identified for that table. At step 1604 a question is asked as to whether another table remains to be considered. If other tables remain to be considered, control is directed to step 1601. Alternatively, this marks the end of the steps for identifying preferred indexes.

The identification of indexable predicate sets and selected lists is illustrated by way of examples shown in FIGS. 17 to 19. In FIG. 17, a user query has been interpreted as a request for all book titles and their respective prices, from the Books table 501, with the two conditions that the author's second name 602 is "Kirk" and the topic 604 is "Computing". The indexable predicate set from these user-specified conditions is author with topic, and the select list is book title and price. Examples of non-indexable predicate sets are queries that are non-specific, for example, queries such as topic not-equal-to "Computing", or, Author is-not-in ("Ziegler", "Kirk", "Halsal") which gives all authors after Ziegler, in alphabetical order.

Both the indexable predicate set and the select list can be defined as columns within the Books table 501, as illustrated in FIG. 6. When the predicate set can be specified in terms of specific data for one or several columns, this is considered to be an indexable predicate set. In other words, an index or indexes could be constructed to satisfy the query that might provide a substantial advantage over the time taken to search the table 501.

The select list is the list of data columns required as output from the database. If a combined index was created that included the book title and price in its combination key, then such an index would provide access to the data without having to access the main table 501 at all. This possibility is taken into consideration when evaluating index performance, to be described later. Similar examples are shown in FIGS. 18 and 19, thus illustrating the derivation of indexable predicate sets and select lists from typical user queries.

Figure 16:
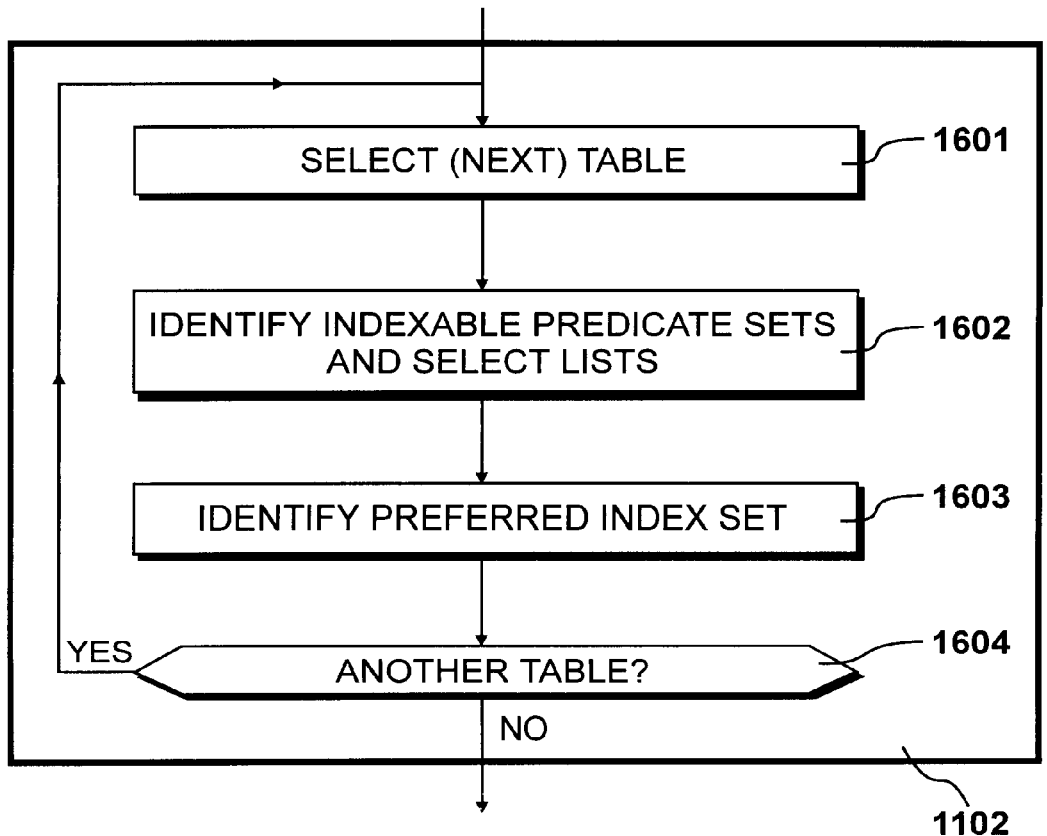
FIG. 16 details the step of identifying preferred indexes shown in FIG. 11, including a step of identifying indexable predicate sets and select lists, and a step of identifying a preferred index set.

If the columns shown in FIG. 6 are considered as being labelled A to I, the indexable predicate sets for a table, identified at step 1602 in FIG. 16, may be considered as shown in FIG. 20. Furthermore, select lists associated with each predicate set may be considered as shown in FIG. 21. Thus, for each table, all SQL is analysed to give indexable predicate sets, shown in FIG. 20, and the predicate sets with their associated select lists shown in FIG. 21. Of these, the indexable predicate sets are the most important, with consideration of select lists being an additional refinement to the method which is to be described.

Figure 22:
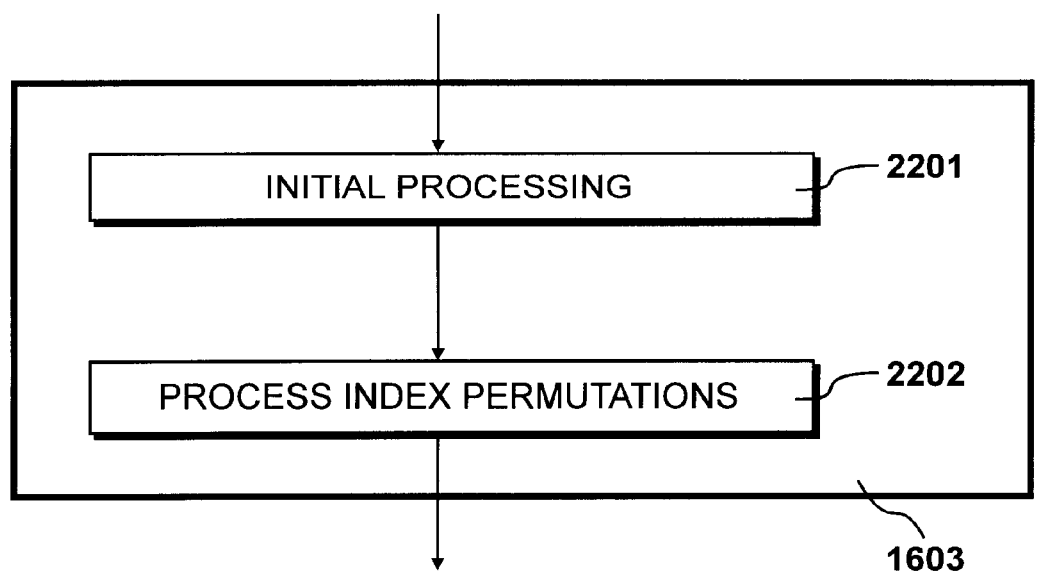
FIG. 22 summarises the step of identifying a preferred index set shown in FIG. 16, including a step of initial processing and a step of processing index permutations.

Identification of a preferred index set for a table, shown at step 1603 in FIG. 16, is summarised in FIG. 22. At step 2201 initial processing is performed and at step 2202 index permutations are processed. In the present embodiment, step 2201 identifies an initial single column index as the initial preferred index set. Step 2202 considers permutations of columns derived from indexable predicate sets within user queries, in order to identify an improved preferred index set, with reference to more than one column in a table. For the purpose of the present description, a preferred index set may include any of the following: a single index, a single composite index, or multiple indexes of the single column and or composite (multiple column) type.

Figure 23:
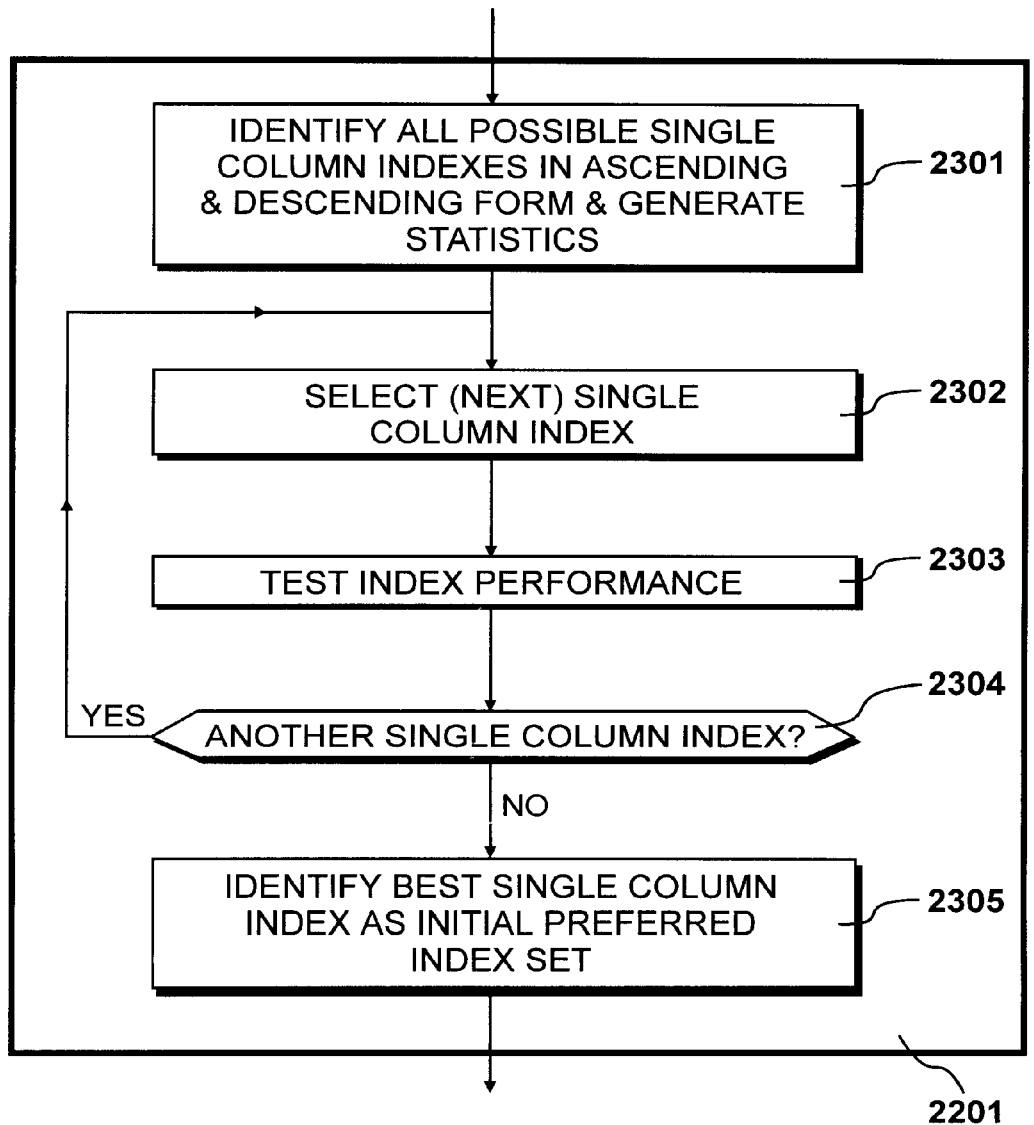
FIG. 23 details the step of initial processing shown in FIG. 22.

Initial processing carried out at step 2201 is further detailed in FIG. 23. At step 2301 all possible single column indexes derived from indexable predicate sets for a table are identified in their ascending and descending forms, and catalog statistics are generated for each of these indexes respectively. With reference to FIG. 20, indexable predicate sets refer to columns A, B, C, E, and G. The possible single column indexes are keyed on these columns. However, an index may be created in an ascending or descending form, as these have different performances under different conditions of data access. The complete set of single column indexes in this example would therefore be: (A ASC), (A DESC), (B ASC), (B DESC), (C ASC), (C DESC), (E ASC), (E DESC), (G ASC) and (G DESC).

A single column index is selected at step 2302, and at step 2303 its performance is measured. The performance is measured by creating the index on the trial database 312, updating the catalog with statistics for the associated index on the trial database. The statistics that are updated are values for FIRSTKEYCARD, FULLKEYCARD, NLEAF, NLEVELS and CLUSTERRATIO. The cost saving of the sample of SQL statements is then evaluated.

The cost saving is determined by obtaining a cost for each statement of SQL that accesses the table under consideration, while the trial indexes are present. Each individual SQL statement's cost is then multiplied by its frequency of use for the associated table. These costs are then summed to give a cost for operating the system with the trial indexes in place. This may be considered as the index cost. This is subtracted from the default cost obtained at step 1206 in FIG. 12, to give the cost saving. The cost saving provides the indication of index performance that is used to select preferred indexes.

In existing versions of DB2, the mechanisms provided within the DB2 environment do not take into account the cost of index maintenance that occurs when an index or indexes need to be modified as a result of a data record being added or deleted from the database. Thus, additional compensation of the cost value for an SQL statement that results in an insert or delete must be made. For a given SQL statement having a cost x, the number n of indexes affected by the statement is determined, and x is multiplied by n/2 to give the compensated cost. This compensation includes compensation for maintenance of the default indexes, as well as those under test. It is anticipated the future versions of DB2 and other database environments may include compensation automatically within SQL costing procedures. Thus, at present, when obtaining the index cost, statements that result in index maintenance must have their cost values compensated in this way, so that the overall index cost, and hence the cost saving resulting from the indexes on trial, is sufficiently representative of real operational costs when the indexes are in place.

The cost saving is recorded in association with the index, and at step 2304 the next single column index is selected. Thus, (A ASC) and (A DESC) are tested separately. After all possible single column indexes have been tested in this way, control is directed to step 2305, where the single column index giving the highest cost saving is selected for inclusion in the preferred index set.

Figure 24:
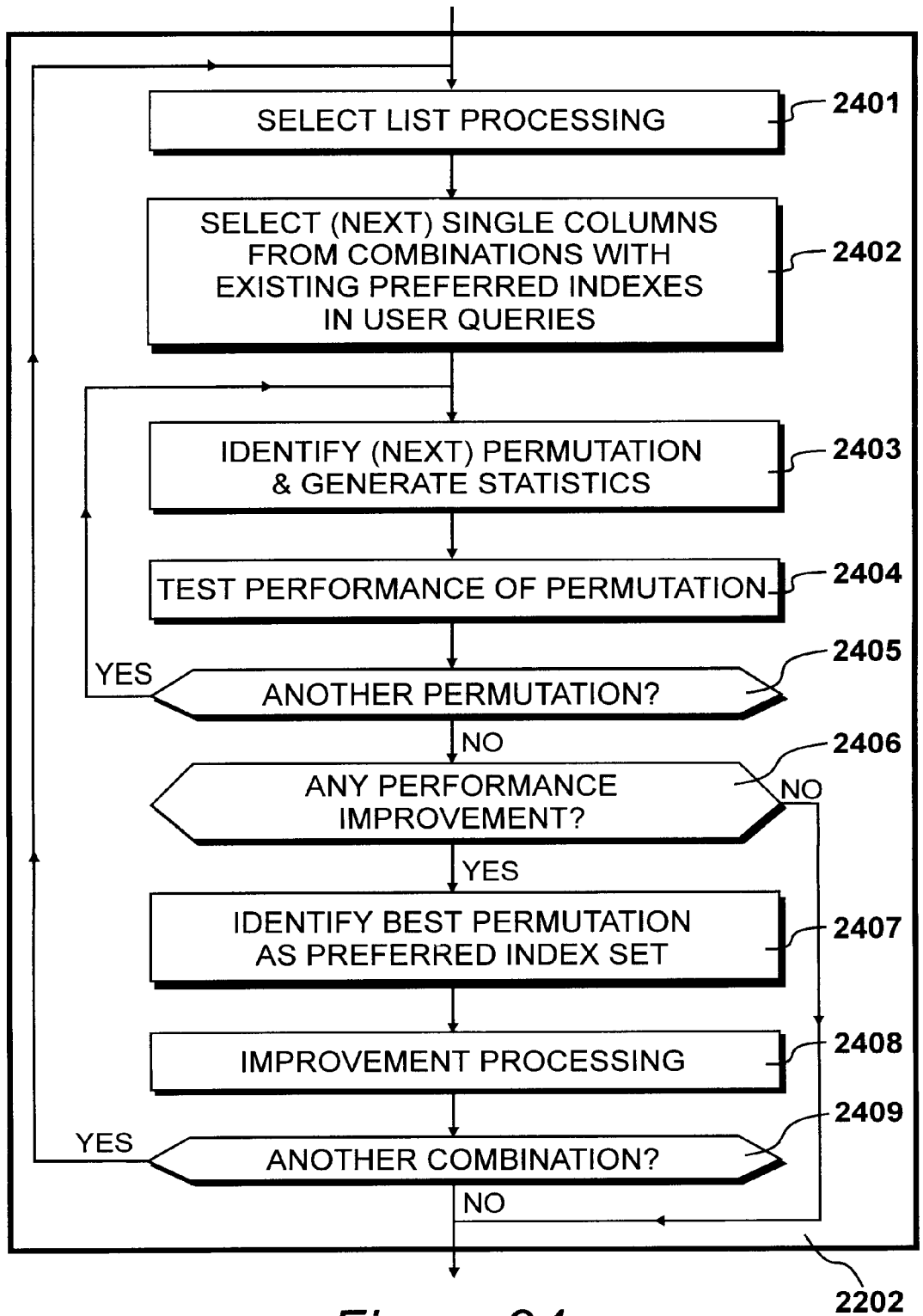
FIG. 24 details the step of processing index permutations shown in FIG. 22, including a step of select list processing and a step of improvement processing.

The step of processing index permutations, shown at step 2202 in FIG. 22, is detailed in FIG. 24. At step 2401 select list processing is performed, as described below. At step 2402 a single column is identified from combinations with the indexes in the preferred index set, by examining indexable predicate sets. The indexable predicate sets are derived from queries, as shown in FIGS. 17, 18 and 19. Step 2402 identifies a column by examining columns as shown in FIG.

20. For example, if the current preferred index set comprises (G ASC), columns A, B and E are all used with column G in the indexable predicate sets, and therefore step 2402 initially identifies columns A, B and E.

At step 2403 a first index permutation is identified and catalog statistics are generated for it. If the existing preferred index is (G ASC), the first permutation is two indexes: (G ASC) with (A ASC). At step 2404, the performance of the index permutation is measured. The performance is measured by creating the index on the trial database 312, updating the catalog with statistics for the associated index on the trial database, and then costing the sample of SQL statements, as with step 2303 in FIG. 23. The cost saving is then recorded in association with the index permutation, and at step 2405 another permutation is selected. The next index permutation identified at step 2403 will be (G ASC) with (A DESC) as separate indexes. Subsequent similar iterations are performed with separate indexes for columns B and E, which were originally identified at step 2402.

However, more permutations are possible, by considering the existing columns referenced in the preferred index set with the columns identified at step 2402 as composite indexes. Thus, starting with an existing preferred set of (G ASC), the additional permutations with columns A, B and E are (G ASC, A ASC), (G ASC, A DESC), (G ASC, B ASC), (G ASC, B DESC), (G ASC, E ASC) and (G ASC, E DESC). Therefore, in this example, there is a total of twelve permutations. Each of these is tested at step 2404. At step 2406 a question is asked as to whether there has been any performance improvement. If no performance improvement has been observed, this marks the end of index optimisation for the table under consideration. Alternatively, if performance improvement has been observed, at step 2407 the best index permutation is selected as the preferred index set. At step 2408, improvement processing is performed. This is described later on. At step 2409 a question is asked as to whether any additional combinations can be identified with the columns referenced in the preferred index set. If not, this marks the end of index optimisation.

Supposing that the new preferred index set, identified at step 2407, is (G ASC, E DESC). This restricts remaining combinations to those columns that are referenced in queries with columns G and E. In FIG. 20, there are two columns that satisfy this condition: A and B. In the next iteration of steps 2402 to 2409, therefore, columns A and B will be used to define index permutations with the existing preferred index (G ASC, E DESC). Steps 2402 to 2409 are repeated until either step 2406 or step 2409 terminates the process.

Figure 25:
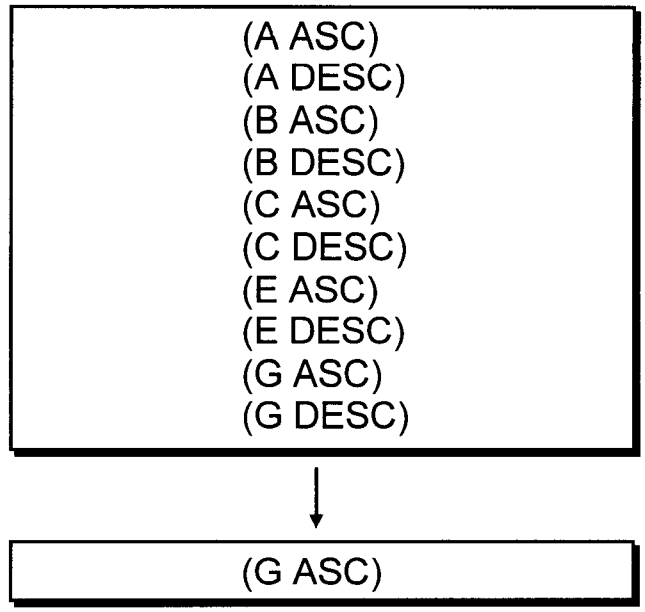
FIGS. 25 to 28 illustrate the effect of procedures detailed in FIGS. 23 and 24.
Figure 26:
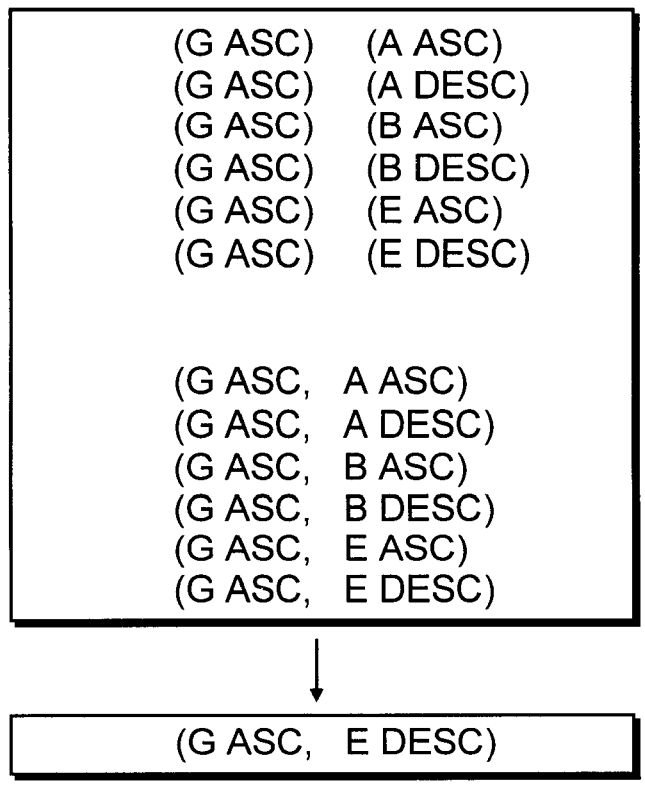
Figure 27:
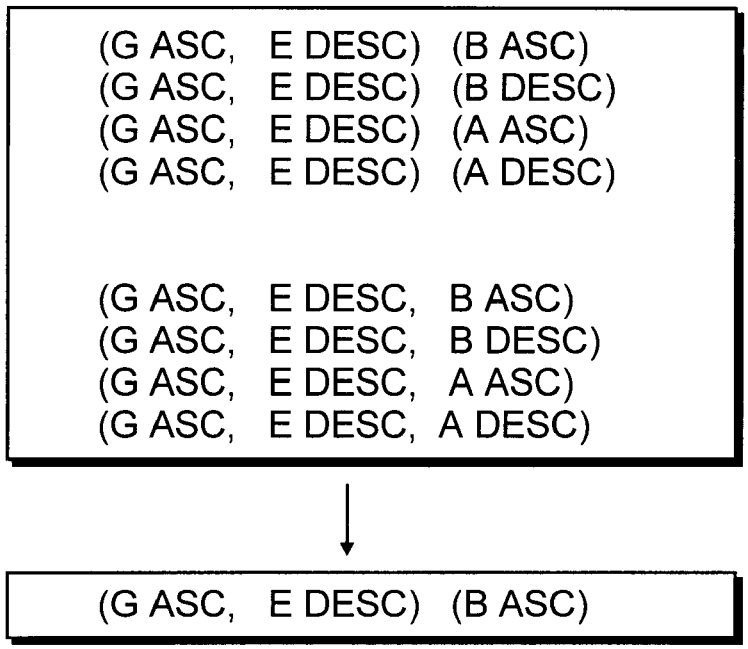
Figure 28:
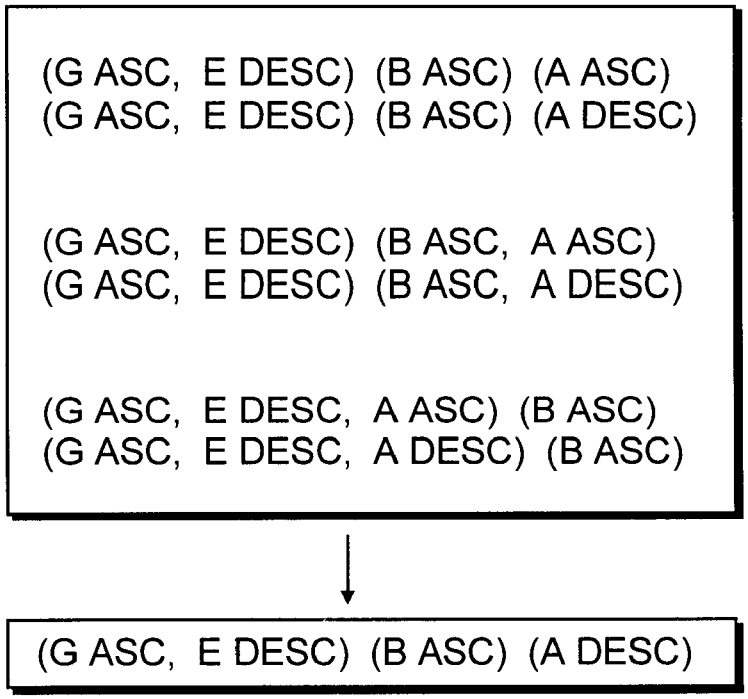

The example described above is illustrated in FIGS. 25 and 26, with the complete set of iterations continued through FIGS. 27 and 28. FIG. 25 illustrates step 2201, the initial processing, in which a single column index (G ASC) is identified. FIGS. 26 to 28 illustrate step 2202, processing index permutations, in which iterations of steps 2402 to 2409 identify preferred index sets of (G ASC, E DESC), (G ASC, E DESC) (B ASC) and finally (G ASC, E DESC) (B ASC) (A DESC).

In this relatively simple example, only a few indexes are evaluated, and the permutations have been restricted to those identified in FIG. 20. In a real situation however, many more permutations may be identified, and each index permutation takes significant time to test. However, the number of permutations is restricted, by step 2402, by referring to indexable predicate sets derived from user queries. By deriving the set of indexes from a set of earlier results, in combination with permutations determined by the indexable predicate sets, the number of permutations is dramatically reduced.

User queries making up the workload define patterns of data access, and these define a subset of access permutations within the set of those that are possible. The preferred index set is developed from index permutations that are restricted to those defined by recorded patterns of user access. Consequently, the time taken to identify a preferred index set is thereby reduced by many orders of magnitude. This is done without compromising the quality of the resulting preferred index set.

Figure 29:
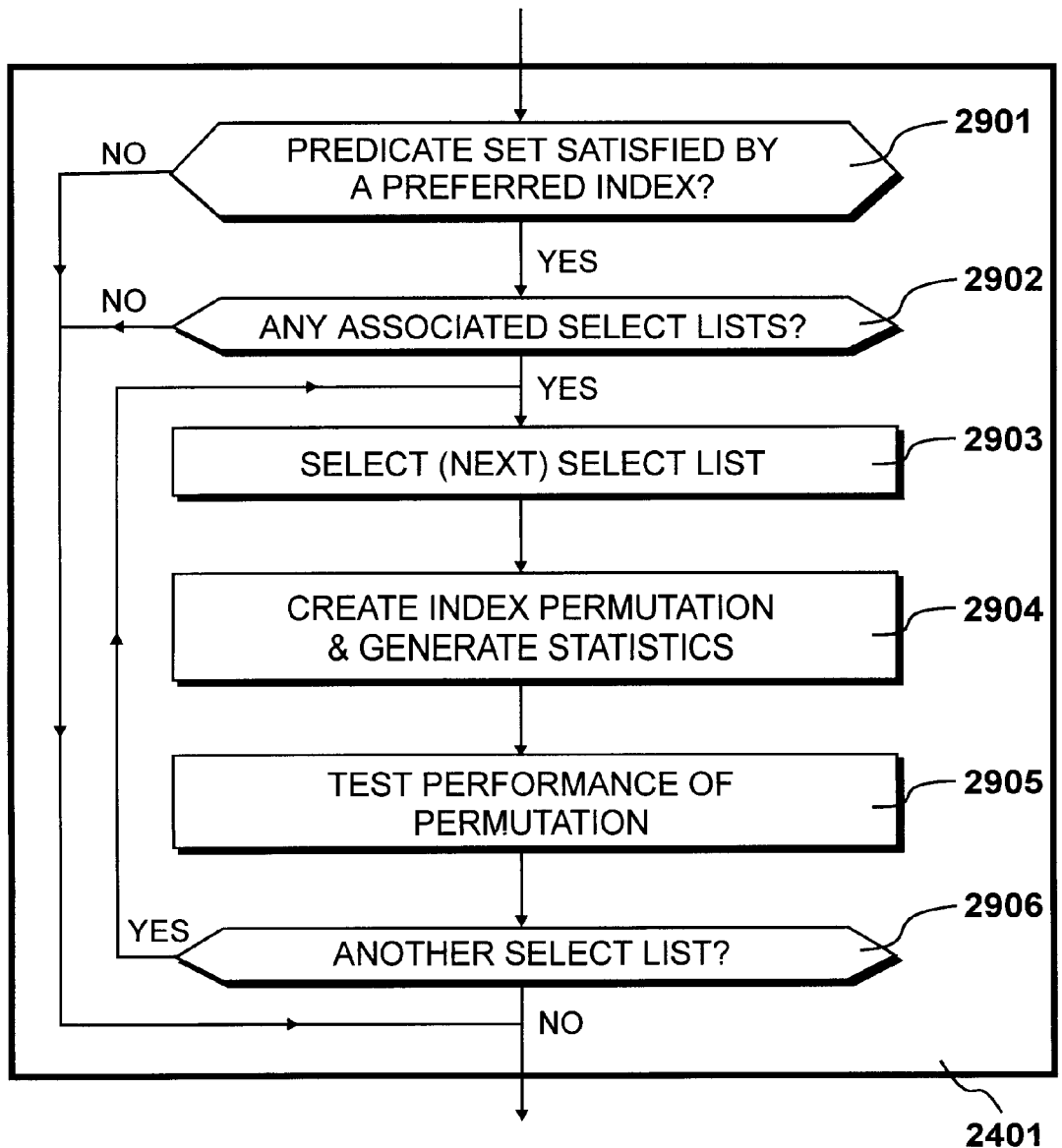
FIG. 29 details the step of select list processing shown in FIG. 24.

The step of select list processing, identified at step 2401 in FIG. 24, is detailed in FIG. 29. At step 2901 a question is asked as to whether a predicate set has been completely satisfied by a newly created index permutation. This may be understood by looking at FIG. 21. Supposing an index permutation, such as (G ASC, A ASC) has just been identified and its performance measured. From FIG. 21, the column combination G with A has two associated select lists: E B and E B C. At step 2902 a question is asked as to whether there are any associated select lists. In this example there are two, therefore control is directed to step 2903. At step 2903 the first of the two select lists is selected. At step 2904 an index (G ASC, A ASC, E ASC, B ASC) is created that includes the select list columns. Statistics are then created for the index. It should be noted that the select list columns are only tested in the ascending form in the present embodiment, in order to reduce the number of permutations. At step 2905 the performance of the index permutation with the select list is measured. At step 2906 the next select list is selected. On the second and final loop, (G ASC, A ASC, E ASC, B ASC, C ASC) is the index that is created to satisfy the second select list.

Select list columns are only added to individual indexes that fully satisfy a predicate set. For example, (G ASC, E DESC B ASC A ASC) would append the columns C and F from the associated select list in FIG. 21 in the following index permutation: (G ASC, E DESC, B ASC, A ASC, C ASC, F ASC).

Step 2407 in FIG. 24, that identifies the best permutation, compares performances measured at steps 2404 and 2905.

Improvement processing performed at step 2408 in FIG. 24 is illustrated in FIG. 30. A first phase 3001 is completed by executing initial processing 2201, in which a single column index is identified as being the best out of all single column indexes. This has an associated cost saving, which is the greatest of all indexes tested in the first phase. Subsequent phases 3002 to 3006 result from execution of step 2202, in which index permutations based on user queries are processed. Each phase corresponds to a single iteration of steps 2401 to 2409 shown in FIG. 24. As processing progresses, each additional phase results in a lower and lower increase in cost saving until phase 3006, where the cost saving 3011 goes against the trend. This is considered as resulting from identification of a particularly useful single column, from which index permutations have been generated. In improvement processing, previous improvements are compared until the most recent similar level of improvement 3012 is identified. Phases 3004 onwards are discarded. The index identified in phase 3006 is then added to the preferred index set obtained at phase 3003 and the process continues to determine permutations with the preferred index set identified in phase 3003, discarding preferred indexes obtained in steps 3004 and 3005. Processing then continues in the manner previously described.

Index performance measurement, as identified in steps 2303, 2404 and 2905, is carried out in the presence of default indexes, which would be always created for a table. The default indexes are the primary, clustering and foreign key indexes. A table has a primary key, such as ISBN for table 501, and an index based on ISBN will always therefore be used as a default index.

The present embodiment relates to processing customer requests that have been expressed in the form of a URL-appended character string. The string is then translated into SQL that is commonly used to access a database. The invention relates to improving the method of database access in response to queries, and queries may, in an alternative embodiment, be expressed in a form that is more appropriate to its environment. For example, the invention may apply to optimising indexes for a database, in which queries are expressed by a user's voice. A response can then be transmitted back to the user by speech synthesis. In order to maintain a dialogue, it is necessary to ensure that response delays are kept to a minimum. The invention may be advantageously applied in any database system where a table columns are indexable, and indications of user access patterns are recoradable.

Alternatively SQL or other representations can be derived from a banking transaction processing system, or any other system that is capable of generating database access commands automatically.

In the present embodiment, customers make enquiries about book availability, and possibly place an order. In an alternative embodiment, the customer is an automated transaction system, in which, for example, an automated factory production line identifies a requirement for raw materials or key components in the manufacturing process. Automated parts ordering processes access a supplier that includes an on-line database that holds data representing millions of different component parts available world-wide from thousands of local distributors. This represents an entirely automated environment. In such an environment, it is possible for the human-related time span for access to a database to be shrunk by several orders of magnitude, and an expectation is created that information should be even more quickly available, and that transactions involving many thousands of different parts for an automated production line will be carried out in minutes. In such a system, the requirement for index efficiency is increased dramatically. The invention described herein provides a method of achieving this. It will be understood therefore, that in the above description, customers or users may include automated facilities for generating orders.

Furthermore, the method of accessing a database generally defined as a query, may in fact be a request to write data to a part of a database, or any action that results in a requirement to obtain read or write access to a data item or items in a database of any sort.

What is claimed is:

1. A method of identifying preferred indexes for a database wherein said database has received queries from users, comprising the steps of:
   analyzing a sample of user queries to identify candidate indexes;
   identifying an initial preferred index set by processing said candidate indexes;
   identifying a first index permutation comprising said initial preferred index set and a separate one of said candidate indexes;
   identifying a second index permutation by processing said initial preferred index set and one of said candidate indexes such that said second index permutation includes a composite index of said candidate index and an index of said initial preferred index set; and
   identifying a new preferred index set by comparing performance of said first and second index permutations.

2. A method according to claim 1, wherein said step of analyzing a sample of user queries includes an identification of indexable predicate sets.

3. A method according to claim 1, wherein said step of analyzing a sample of user queries includes an identification of patterns for index-only access.

4. A method according to claim 1, wherein said permutations include indexes suitable for index-only access.

5. A method according to claim 1, wherein said database is a relational database.

6. A method according to claim 5, wherein said preferred index set is identified for each table in said relational database.

7. A method according to claim 1, wherein said steps of identifying index permutations and identifying a new preferred index set are repeated, and intermediate results are discarded in response to a change in the rate of preferred index set improvement.

8. A method according to claim 1, wherein earlier permutations of indexes chosen progressively guide and restrict the search path of the process.

9. A method according to claim 1, wherein said steps of identifying index permutations and identifying a new preferred index set are repeated and a later found preferred index, which has a much higher cost saving than an earlier preferred index causes said earlier preferred index to be discarded.

10. A method according to claim 1, wherein said steps of identifying index permutations and identifying a new preferred index set are repeated and a later found preferred index, which has a higher cost saving than an earlier preferred index, causes preferred indexes from said earlier preferred index onwards to be discarded.

11. A method according to claim 1, wherein said initial preferred index set comprises one index only.

12. A method according to claim 11, wherein said initial preferred index set comprises one single column index only.

13. Preferred index identification apparatus configured to identify preferred indexes for a database system, comprising:
   input means configured to receive queries from users;
   analyzing means configured to analyze a sample of said user queries to identify candidate indexes;
   identifying means configured to
      (a) identify an initial preferred index set by processing said candidate indexes;
      (b) identify a first index permutation comprising said, initial preferred index set and a separate one of said candidate indexes: and
      (c) identify a second index permutation by processing said initial preferred index set and one of said candidate indexes such that said second index permutation includes a composite index of said candidate index and an index of said initial preferred index set; and
   comparison means configured to compare performances of said first and second index permutations and thereby identify a new preferred index set.

14. Apparatus according to claim 13, wherein said analyzing means analyzes said user queries to identify patterns for index only access.

15. Apparatus according to claim 13, wherein said analyzing means analyzes said user queries to identify patterns for index-only access.

16. Apparatus according to claim 13, wherein said identifying means identifies index permutations for index only access.

17. Apparatus according to claim 13, configured to identify preferred indexes for a relational database.

18. Apparatus according to claim 17, configured to identify a preferred index set for each table in said relational database.

19. Apparatus according to claim 13, wherein said identifying means is configured to repeatedly identify index permutations and preferred index sets, including means for discarding intermediate results in response to a change in the rate of preferred index set improvement.

20. Apparatus according to claim 13, wherein said identifying means is configured to identify an initial preferred index set comprising only one index.

21. Apparatus according to claim 20, wherein said initial preferred index set comprises one single column index only.

22. A computer-readable medium having computer-readable instructions executable by a computer such that, when executing said instructions, a computer will perform the steps of:

analyzing a sample of user queries to identify candidate indexes;

identifying an initial preferred index set by processing said candidate indexes;

identifying a first index permutation comprising said initial preferred index set and a separate one of said candidate indexes;

identifying a second index permutation by processing said initial preferred index set and one of said candidate indexes such that said second index permutation includes a composite index of said candidate index and an index of said initial preferred index set; and identifying a new preferred index set by comparing performance of said first and second index permutations.

23. A computer-readable medium having computer-readable instructions according to claim 22, such that when executing said instructions to analyze a sample of user queries, indexable predicate sets are identified.

24. A computer-readable medium having computer-readable instructions according to claim 22, such that when executing said instructions to analyze a sample of user queries, patterns for index-only access are identified.

25. A computer-readable medium having computer-readable instructions according to claim 22, such that when executing said instructions to compare the performance of index permutations, indexes suitable for index-only access are included.

26. A computer-readable medium having computer-readable instructions according to claim 22, executable within the environment of a relational database.

27. A computer-readable medium having computer-readable instructions according to claim 26, such that when executing said instructions, a computer will identify a preferred index set for each table in said relational database.

28. A computer-readable medium having computer-readable instructions according to claim 22, such that when executing said instructions said steps of identifying index permutations and identifying a preferred index set are repeated.

29. A computer-readable medium having computer-readable instructions according to claim 28, wherein intermediate results are discarded in response to a change in the rate of preferred index set improvement.

30. A computer-readable medium having computer-readable instructions according to claim 28, such that when executing said instructions, a computer will stop repeating said repeated steps when new index permutations do not have a substantially increased performance.

* * * * *